US008902298B2

(12) United States Patent
Ito et al.

(10) Patent No.: US 8,902,298 B2
(45) Date of Patent: Dec. 2, 2014

(54) STORAGE MEDIUM HAVING STORED THEREIN STEREOSCOPIC IMAGE DISPLAY PROGRAM, STEREOSCOPIC IMAGE DISPLAY DEVICE, STEREOSCOPIC IMAGE DISPLAY SYSTEM, AND STEREOSCOPIC IMAGE DISPLAY METHOD

(75) Inventors: Yuichiro Ito, Kyoto (JP); Yuki Nishimura, Kai (JP)

(73) Assignees: Nintendo Co., Ltd., Kyoto (JP); HAL Laboratory, Inc., Tokyo (JP)

( * ) Notice: Subject to any disclaimer, the term of this patent is extended or adjusted under 35 U.S.C. 154(b) by 662 days.

(21) Appl. No.: 13/154,991

(22) Filed: Jun. 7, 2011

(65) Prior Publication Data
US 2011/0304711 A1 Dec. 15, 2011

(30) Foreign Application Priority Data

Jun. 14, 2010 (JP) ................................. 2010-135313
Jun. 14, 2010 (JP) ................................. 2010-135314
Jun. 14, 2010 (JP) ................................. 2010-135315
Jun. 14, 2010 (JP) ................................. 2010-135316

(51) Int. Cl.
*H04N 13/04* (2006.01)
*H04N 15/00* (2006.01)
*H04N 13/00* (2006.01)
*H04N 13/02* (2006.01)
*A63F 13/40* (2014.01)

(52) U.S. Cl.
CPC ......... *H04N 13/0011* (2013.01); *H04N 13/004* (2013.01); *H04N 13/0402* (2013.01); *H04N 13/0296* (2013.01); *A63F 2300/6676* (2013.01); *H04N 13/0239* (2013.01); *A63F 2300/1093* (2013.01); *H04N 13/0022* (2013.01); *A63F 13/10* (2013.01); *H04N 13/0029* (2013.01); *A63F 2300/30* (2013.01); *A63F 2300/69* (2013.01)
USPC .......................................................... 348/51

(58) Field of Classification Search
CPC .......... H04N 13/0239; H04N 13/0296; H04N 13/0055; H04N 2013/0081; H04N 13/0497; H04N 13/0404; H04N 13/0409; H04N 13/0422; G06T 7/0022; G02B 27/2214
USPC ........................................................... 348/51
See application file for complete search history.

(56) References Cited

U.S. PATENT DOCUMENTS 6,762,794 B1 * 7/2004 Ogino .......................... 348/262
8,026,950 B2   9/2011 Hill et al.
(Continued)

FOREIGN PATENT DOCUMENTS

EP          0 830 034        3/1998
EP          0 905 988        3/1999
(Continued)

OTHER PUBLICATIONS

Mar. 19, 2013 Office Action in U.S. Appl. No. 13/154,926, 14 pages.
(Continued)

*Primary Examiner* — Andy Rao
*Assistant Examiner* — Jared Walker
(74) *Attorney, Agent, or Firm* — Nixon & Vanderhye, P.C.

(57) ABSTRACT

An example game device sets a reference distance for a distance from a real camera in an image-capturing direction, and displays a right captured image and a left captured image in a display area so that a reference point, which is a point that is away from the real camera by the reference distance, is displayed at a center in the display area. Thus, when an image produced by using an augmented reality technique is stereoscopically displayed, it is possible to display a virtual image in a manner easy to view.

10 Claims, 17 Drawing Sheets

(56) References Cited

U.S. PATENT DOCUMENTS

| | | | |
|---|---|---|---|
| 2002/0005891 A1 | 1/2002 | Wilson et al. | |
| 2002/0036617 A1 | 3/2002 | Pryor | |
| 2002/0163482 A1* | 11/2002 | Sullivan | 345/6 |
| 2003/0152263 A1 | 8/2003 | Kawano et al. | |
| 2004/0104935 A1* | 6/2004 | Williamson et al. | 345/757 |
| 2004/0233275 A1* | 11/2004 | Tomita | 348/51 |
| 2005/0129325 A1* | 6/2005 | Wu | 382/254 |
| 2008/0266386 A1 | 10/2008 | Maeda | |
| 2009/0219283 A1 | 9/2009 | Hendrickson et al. | |
| 2009/0237492 A1 | 9/2009 | Kikinis et al. | |
| 2010/0231691 A1 | 9/2010 | Lee | |

FOREIGN PATENT DOCUMENTS

| | | |
|---|---|---|
| EP | 1 408 703 A2 | 4/2004 |
| EP | 1 628 490 A1 | 2/2006 |
| EP | 1 720 131 | 11/2006 |
| EP | 2 393 300 | 12/2011 |
| JP | 2003-264851 | 9/2003 |
| JP | 2004-129186 | 4/2004 |
| JP | 2004-343290 | 12/2004 |
| JP | 2008-146109 | 6/2008 |
| JP | 2010-56737 | 3/2010 |
| WO | WO 03/034705 A2 | 4/2003 |

OTHER PUBLICATIONS

Dec. 5, 2013 Office Action in U.S. Appl. No. 13/154,904, 27 pages.
Kanbara et al., "A Stereoscopic Video See-Through Augmented Reality System Based on Real-time Vision-based Registration", Proceedings IEEE 2000 Virtual Reality, Mar. 18-22, 2000. pp. 255-262, 8 pages.
EPO Search Report for App. 11166513.9, Feb. 1, 2012, 8 pages.
EPO Search Report for App. 11166510.5, Jan. 26, 2012, 7 pages.
EPO Search Report for App. 11166521.2, Jan. 26, 2012, 8 pages.
Oct. 16, 2013 final Office Action from U.S. Appl. No. 13/154,926, 12 pages.
Jan. 15, 2014 Office Action in U.S. Appl. No. 13/154,964, 25 pages.
Notice of Allowance mailed May 9, 2014, in U.S. Appl. No. 13/154,926 (9 pages).

* cited by examiner (THIRD POSITION)

(FIRST POSITION)

(SECOND POSITION)

STORAGE MEDIUM HAVING STORED THEREIN STEREOSCOPIC IMAGE DISPLAY PROGRAM, STEREOSCOPIC IMAGE DISPLAY DEVICE, STEREOSCOPIC IMAGE DISPLAY SYSTEM, AND STEREOSCOPIC IMAGE DISPLAY METHOD

CROSS REFERENCE TO RELATED APPLICATION

The disclosure of Japanese Patent Application Nos. 2010-135313, 2010-135314, 2010-135315 and 2010-135316 filed on Jun. 14, 2010 is incorporated herein by reference.

BACKGROUND OF THE INVENTION

1. Field of the Invention

The present invention relates to a storage medium having stored therein a stereoscopic image display program for stereoscopically displaying a captured image, a stereoscopic image display device, a stereoscopic image display system, and a stereoscopic image display method.

2. Description of the Background Art

There are conventional techniques for stereoscopically displaying an image by using a plurality of images captured by a plurality of cameras.

For example, Japanese Laid-Open Patent Publication No. 2010-056737 describes a device for stereoscopically displaying a captured image by using captured images taken from two CCDs.

However, Japanese Laid-Open Patent Publication No. 2010-056737 has room for improvement in terms of the stereoscopic viewability.

SUMMARY OF THE INVENTION

Thus, an object of the present invention is to provide a storage medium having stored therein a stereoscopic image display program, a stereoscopic image display device, a stereoscopic image display system, and a stereoscopic image display method, with which it is possible to display a stereoscopic image in a manner easy to view.

In order to solve the above problem, the present invention employs the following configurations.

The present invention is a computer-readable storage medium having stored therein an image display program for stereoscopically displaying a captured image on a stereoscopically-viewable stereoscopic display member by displaying, in substantially a same display area, a right-eye image and a left-eye image by using a right captured image outputted from a right-eye real camera and a left captured image outputted from a left-eye real camera. The image display program instructs a computer to function as: a reference distance setting section for setting a reference distance for a distance from the real camera in an image-capturing direction; and a stereoscopic display control section for displaying the right captured image in the display area so that a reference point in the right captured image is displayed at a center of the display area and displaying the left captured image in the display area so that a reference point in the left captured image is displayed at the center of the display area, wherein the reference point is a point that is away from the real cameras by the reference distance in the image-capturing direction of the two real cameras on a straight line passing through a median point between the two real cameras and extending in the image-capturing direction.

With this invention, when an image of the real world is stereoscopically displayed, it is possible to control the distance to an object that is displayed with zero parallax on the screen. In view of the ease of stereoscopic viewing by the user, it is one of the technical issues how to set a display object for which the parallax is zero on the screen. This is because with such a display device, it is easy to view an object for which the parallax is zero on the screen.

In the present invention, it may include: a display area determination member for determining a right display area which is an area of the right captured image to be displayed in the display area and which is centered about a point corresponding to the reference point in the right captured image, and determining a left display area which is an area of the left captured image to be displayed in the display area and which is centered about a point corresponding to the reference point in the left captured image; and a display control member for displaying the right display area of the right captured image and the left display area of the left captured image in the display area based on the areas determined by the display area determination member.

With this invention, captured images will not be cut off.

In the present invention, the reference distance setting section may fixedly set the reference distance.

With this invention, a real object at a certain distance from the real camera can be made to be easily viewable.

In the present invention, the computer may be instructed to further function as a distance calculation section for calculating a distance to a predetermined image-capture object; and the reference distance setting section may set the distance calculated by the distance calculation section as the reference distance.

With this invention, a predetermined object can be made to be easily viewable.

In the present invention, the reference distance setting section may set the reference distance using the distance calculated by the distance calculation section as a reference.

In the present invention, the reference distance setting section may set, as the reference distance, a value obtained by adding or subtracting a predetermined value to/from the distance calculated by the distance calculation section. Note that the "predetermined value" does not have to be a fixed value.

With this invention, it is possible to set the distance at which it is easy to view using the distance to the predetermined object as a reference. For example, it can be set to be nearer by a certain distance or farther by a certain distance with respect to the predetermined object. Note that although it is possible to set the parallax of a predetermined object to zero by matching the predetermined object in the right captured image and the predetermined object in the left captured image with each other through pattern matching, it is not possible with such a matching technique to control it to be nearer or farther by a certain distance with respect to the predetermined object.

In the present invention, using at least one of the right captured image and the left captured image, the distance calculation section may recognize the predetermined image-capture object in the captured image, thereby calculating a distance between the predetermined image-capture object and the real camera.

In the present invention, using at least one of the right captured image and the left captured image, the distance calculation section may recognize a position and an orientation of the predetermined image-capture object in the captured image so as to calculate position/orientation information representing a relative position and orientation relationship between the predetermined image-capture object and the real camera, and to calculate a distance between the predetermined image-capture object and the real camera based on the position/orientation information.

In the present invention, using both of the right captured image and the left captured image, the distance calculation section may recognize a position and an orientation of the predetermined image-capture object in the captured image so as to calculate position/orientation information representing a relative position and orientation relationship between the predetermined image-capture object and the real camera, thereby calculating a distance between the predetermined image-capture object and the real camera based on the position/orientation information.

The present invention may also employ the following configuration. The computer is instructed to further function as a virtual camera setting section for setting a right-eye virtual camera and a left-eye virtual camera in a virtual space; and a virtual image stereoscopic display control section for stereoscopically displaying a virtual image by displaying in the display area a right virtual image obtained by capturing an image of the virtual space with the right-eye virtual camera and a left virtual image obtained by capturing an image of the virtual space with the left-eye virtual camera. Then, wherein the virtual camera setting section sets a projection matrix of the right virtual camera so that a virtual reference point in the right virtual image is displayed at the center of the display area and sets a projection matrix of the left virtual camera so that a virtual reference point in the left virtual image is displayed at the center of the display area, wherein the virtual reference point is a point that is away from the virtual cameras by a distance corresponding to the reference distance in an image-capturing direction of the two virtual cameras on a straight line passing through a median point between the two virtual cameras and extending in the image-capturing direction.

In the present invention, the stereoscopic display control section may display the right captured image and the left captured image in the display area so that the reference point is displayed at the center of the display area by using an angle of view of the real camera and a distance between the real cameras. Note that since the angle of view of the real camera and the distance between the real cameras are normally fixed values, it is not necessary to have these values themselves in the program, and calculations may be done in advance as much as possible.

The present invention is an image display device for stereoscopically displaying a captured image on a stereoscopically-viewable stereoscopic display member by displaying, in substantially a same display area, a right-eye image and a left-eye image by using a right captured image outputted from a right-eye real camera and a left captured image outputted from a left-eye real camera. It includes: a reference distance setting section for setting a reference distance for a distance from the real camera in an image-capturing direction; and a stereoscopic display control section for displaying the right captured image in the display area so that a reference point in the right captured image is displayed at a center of the display area and displaying the left captured image in the display area so that a reference point in the left captured image is displayed at the center of the display area, wherein the reference point is a point that is away from the real cameras by the reference distance in the image-capturing direction of the two real cameras on a straight line passing through a median point between the two real cameras and extending in the image-capturing direction.

The present invention is an image display system for stereoscopically displaying a captured image on a stereoscopically-viewable stereoscopic display member by displaying, in substantially a same display area, a right-eye image and a left-eye image by using a right captured image outputted from a right-eye real camera and a left captured image outputted from a left-eye real camera. It includes: a reference distance setting section for setting a reference distance for a distance from the real camera in an image-capturing direction; and a stereoscopic display control section for displaying the right captured image in the display area so that a reference point in the right captured image is displayed at a center of the display area and displaying the left captured image in the display area so that a reference point in the left captured image is displayed at a center of the display area, wherein the reference point is a point that is away from the real cameras by the reference distance in the image-capturing direction of the two real cameras on a straight line passing through a median point between the two real cameras and extending in the image-capturing direction.

The present invention is an image display method to be executed by a computer for stereoscopically displaying a captured image on a stereoscopically-viewable stereoscopic display member by displaying, in substantially a same display area, a right-eye image and a left-eye image by using a right captured image outputted from a right-eye real camera and a left captured image outputted from a left-eye real camera. It includes: a reference distance setting step of setting a reference distance for a distance from the real camera in an image-capturing direction; and a stereoscopic display control step of displaying the right captured image in the display area so that a reference point in the right captured image is displayed at a center of the display area and displaying the left captured image in the display area so that a reference point in the left captured image is displayed at a center of the display area, wherein the reference point is a point that is away from the real cameras by the reference distance in the image-capturing direction of the two real cameras on a straight line passing through a median point between the two real cameras and extending in the image-capturing direction.

The present invention is an image display program to be executed by a computer of a portable electronic device including, provided on a front surface thereof, a stereoscopic display member for displaying, in substantially a same display area, a right-eye image and a left-eye image, thereby allowing for stereoscopic viewing, and including, provided on a back surface thereof, a right-eye real camera and a left-eye real camera, for stereoscopically displaying a captured image on the stereoscopic display member by using a right captured image outputted from the right-eye real camera and a left captured image outputted from the left-eye real camera. The computer is instructed to function as: a reference distance setting section for setting a reference distance for a distance from the real camera in an image-capturing direction; and a stereoscopic display control section for displaying the right captured image in the display area so that a reference point in the right captured image is displayed at a center of the display area and displaying the left captured image in the display area so that a reference point in the left captured image is displayed at the center of the display area, wherein the reference point is a point that is away from the real cameras by the reference distance in the image-capturing direction of the two real cameras on a straight line passing through a median point between the two real cameras and extending in the image-capturing direction.

The present invention is a portable electronic device including, provided on a front surface thereof, a stereoscopic display member for displaying, in substantially a same display area, a right-eye image and a left-eye image, thereby allowing for stereoscopic viewing, and including, provided on a back surface thereof, a right-eye real camera and a left-eye real camera, for stereoscopically displaying a captured image on the stereoscopic display member by using a right captured image outputted from the right-eye real camera and a left captured image outputted from the left-eye real camera. It is instructed to function as: a reference distance setting section for setting a reference distance for a distance from the real camera in an image-capturing direction; and a stereoscopic display control section for displaying the right captured image in the display area so that a reference point in the right captured image is displayed at a center of the display area and displaying the left captured image in the display area so that a reference point in the left captured image is displayed at the center of the display area, wherein the reference point is a point that is away from the real cameras by the reference distance in the image-capturing direction of the two real cameras on a straight line passing through a median point between the two real cameras and extending in the image-capturing direction.

The present invention is an image display method to be carried out by a computer of a portable electronic device including, provided on a front surface thereof, a stereoscopic display member for displaying, in substantially a same display area, a right-eye image and a left-eye image, thereby allowing for stereoscopic viewing, and including, provided on a back surface thereof, a right-eye real camera and a left-eye real camera, for stereoscopically displaying a captured image on the stereoscopic display member by using a right captured image outputted from the right-eye real camera and a left captured image outputted from the left-eye real camera. It includes: a reference distance setting step of setting a reference distance for a distance from the real camera in an image-capturing direction; and a stereoscopic display control step of displaying the right captured image in the display area so that a reference point in the right captured image is displayed at a center of the display area and displaying the left captured image in the display area so that a reference point in the left captured image is displayed at the center of the display area, wherein the reference point is a point that is away from the real cameras by the reference distance in the image-capturing direction of the two real cameras on a straight line passing through a median point between the two real cameras and extending in the image-capturing direction.

Particularly, where a stereoscopic display member is provided on the front surface of a portable electronic device and a right-eye camera and a left-eye camera are provided on the back surface thereof, it is possible to experience a feel as if one were peeking through the stereoscopic display member. In the present invention, the parallax is zero on the screen at a point (reference point) that is away from the position of the real camera at the current moment by the reference distance in the image-capturing direction. That is, one views with a depth feel as if the point that is away from the position (the position of the screen of the stereoscopic display member) of the real camera at the current moment by the reference distance in the image-capturing direction were present on the screen. That is, an object that is present at a position that is away from the position (the position of the screen of the stereoscopic display member) of the real camera at the current moment by the predetermined distance in the image-capturing direction (an object that is at a predetermined depth position with respect to the screen) is viewed with a predetermined depth feel. Therefore, even if the portable electronic device is moved around, the depth feel of the displayed image on the stereoscopic display member is appropriately maintained with respect to the screen, thus providing the feel as if one were peeking through the stereoscopic display member.

With the present invention, stereoscopic images can be displayed in a manner easy to view.

These and other objects, features, aspects and advantages of the present invention will become more apparent from the following detailed description of the present invention when taken in conjunction with the accompanying drawings.

DESCRIPTION OF THE PREFERRED EMBODIMENTS

[Configuration of Game Device]

Figure 1:
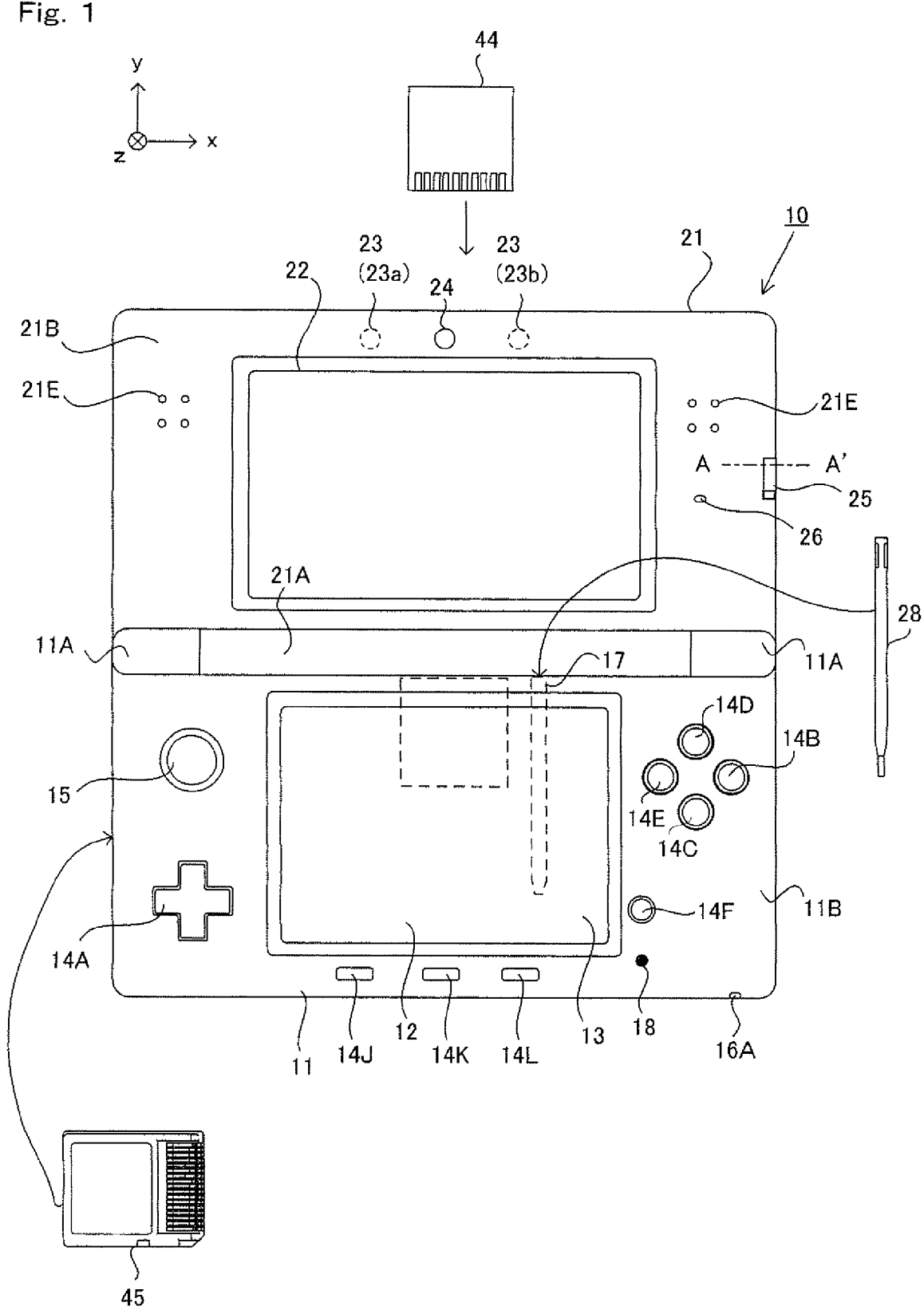
FIG. 1 is a front view of a game device in an open state.
Figure 2:
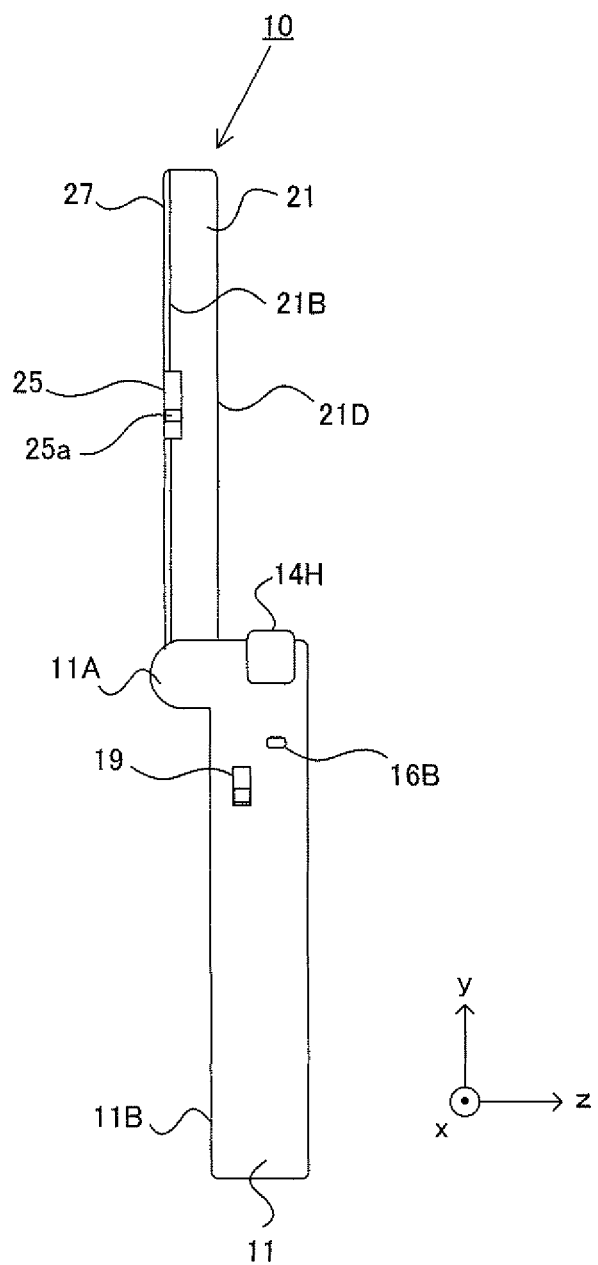
FIG. 2 is a side view of the game device in an open state.
Figure 3:
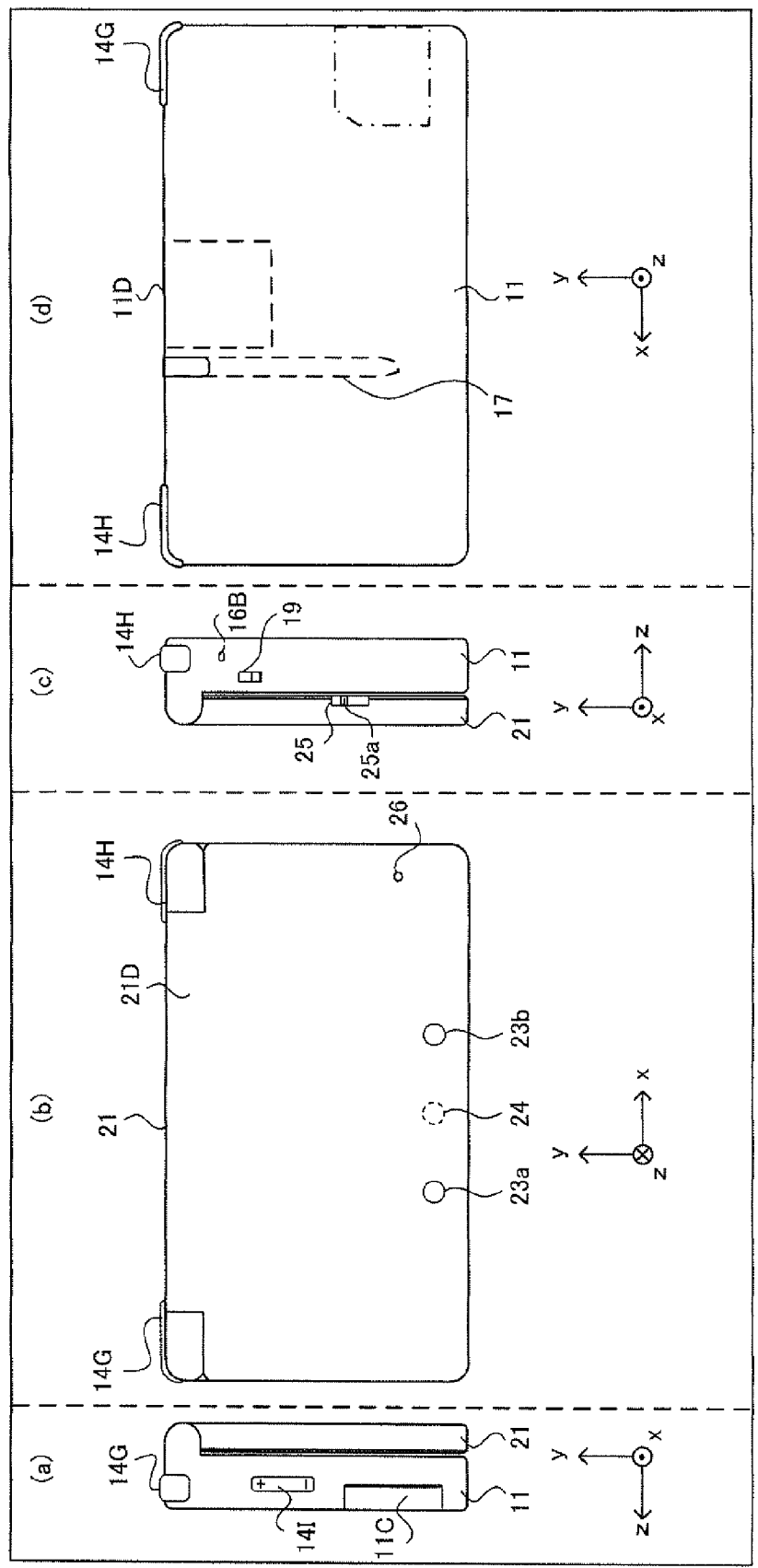
FIG. 3 shows a left side view, a front view, a right side view and a back view of the game device in a closed state.

A game program and a game device, which are embodiments of a stereoscopic image display program and a stereoscopic image display device of the present invention, will now be described with reference to the drawings. FIGS. 1 to 3 are plan views showing external appearance of the game device 10. The game device 10 is a portable game device, and is configured so that it can be folded as shown in FIGS. 1 to 3. FIGS. 1 and 2 show the game device 10 in a state (open state) where it is open, and FIG. 3 shows the game device 10 in a state (closed state) where it is closed. FIG. 1 is a front view of the game device 10 in the open state, and FIG. 2 is a side view of the game device 10 in the open state. The game device 10 can capture an image with a camera, display the captured image on a screen, and store data of the captured image. The game device 10 can execute a predetermined game program, and can display on a screen an image captured by a virtual camera set in a virtual space.

First, referring to FIGS. 1 to 3, an external configuration of the game device 10 will be described. As shown in FIGS. 1 to 3, the game device 10 includes a lower housing 11 and an upper housing 21. The lower housing 11 and the upper housing 21 are connected together so that they can be opened/closed (folded). In the present embodiment, the housings 11 and 21 each have a landscape-oriented rectangular plate shape and are pivotally connected together along their long-side portions.

As shown in FIGS. 1 and 2, protruding portions 11A protruding in a direction vertical to an inner side surface (main surface) 11B of the lower housing 11 are provided along the upper long-side portion of the lower housing 11. A protruding portion 21A protruding from the lower side surface of the upper housing 21 in a direction vertical to the lower side surface is provided along the lower side long-side portion of the upper housing 21. The lower housing 11 and the upper housing 21 are connected together so that they can be folded by coupling the protruding portion 11A of the lower housing 11 with the protruding portion 21A of the upper housing 21.

(Description of Lower Housing)

First, a configuration of the lower housing 11 will be described. As shown in FIGS. 1 to 3, a lower LCD (Liquid Crystal Display) 12, a touch panel 13, operation buttons 14A to 14L (FIG. 1, FIG. 3), an analog stick 15, LEDs 16A to 16B, an insertion hole 17, and a microphone hole 18 are provided in the lower housing 11. Hereinafter, these components will be described in detail.

As shown in FIG. 1, the lower LCD 12 is accommodated in the lower housing 11. The lower LCD 12 has a landscape-oriented shape and is placed so that the long-side direction thereof coincides with the long-side direction of the lower housing 11. The lower LCD 12 is placed in the center of the lower housing 11 with respect to the left-right direction (the x-axis direction shown in FIG. 1). The lower LCD 12 is provided on the inner side surface (main surface) of the lower housing 11, and the screen of the lower LCD 12 is exposed through the opening provided in the lower housing 11. When the game device 10 is not used, it is possible to prevent the screen of the lower LCD 12 from being stained or scratched by having it in the closed state. The number of pixels of the lower LCD 12 may be, for example, 256 dots×192 dots (horizontal×vertical). As opposed to an upper LCD 22 to be described later, the lower LCD 12 is a display device for displaying an image two-dimensionally (not stereoscopically viewable). Note that although an LCD is used as the display device in the present embodiment, any other display device may be used such as a display device using EL (Electro Luminescence), for example. A display device of any resolution may be used as the lower LCD 12.

As shown in FIG. 1, the game device 10 includes the touch panel 13 as an input device. The touch panel 13 is mounted on the screen of the lower LCD 12. Note that in the present embodiment, the touch panel 13 is a resistive film type touch panel. Note however that the touch panel is not limited to the resistive film type, but may be a touch panel of any type such as, for example, the electrostatic capacitance type. In the present embodiment, a touch panel having the same resolution (detection precision) as the resolution of the lower LCD 12 is used as the touch panel 13. Note however that it is not always necessary that the resolution of the touch panel 13 and the resolution of the lower LCD 12 coincide with each other. The insertion hole 17 (a dotted line shown in FIGS. 1 and 3(d)) is provided on the upper side surface of the lower housing 11. The insertion hole 17 can accommodate a touch pen 28 which is used for performing operations on the touch panel 13. Note that although an input on the touch panel 13 is usually made by using the touch pen 28, the present invention is not limited to the touch pen 28 and a finger of the user may be used for making an input on the touch panel 13.

The operation buttons 14A to 14L are each an input device for making a predetermined input. As shown in FIG. 1, among the operation buttons 14A to 14L, a cross button 14A (a direction input button 14A), a button 142, a button 14C, a button 14D, a button 14E, a power button 14F, a select button 14J, a HOME button 14K, and a start button 14L are provided on the inner side surface (main surface) of the lower housing 11. The cross button 14A is cross-shaped, and includes buttons for specifying up, down, left and right directions. The buttons 14A to 14E, the select button 14J, the HOME button 14K, and the start button 14L are assigned functions in accordance with a program executed by the game device 10, as necessary. For example, the cross button 14A is used for selection operation, and the like, and the operation buttons 14B to 14E are used for determination operation, cancellation operation, etc. The power button 14F is used for turning ON/OFF the power of the game device 10.

The analog stick 15 is a device for specifying a direction, and is provided on the inner side surface of the lower housing 11. As shown in FIG. 1, the analog stick 15 is provided above the cross button 14A. The analog stick 15 is configured so that the stick portion to be operated by a finger is tilted in any direction (at any angle in up, down, left, right and diagonal directions) with respect to the inner side surface of the lower housing 11. The analog stick 15 functions in accordance with the program executed by the game device 10. For example, when a game in which a predetermined object appears in a three-dimensional virtual space is executed by the game device 10, the analog stick 15 functions as an input device for moving the predetermined object in the three-dimensional virtual space. In this case, the predetermined object is moved in the direction in which the analog stick 15 is tilted. Note that an analog stick capable of making analog inputs by sliding by a predetermined amount in any direction, i.e., up, down, left, right and diagonal directions, may be used as the analog stick 15.

FIG. 3(a) is a left side view of the game device 10 in the closed state, FIG. 3(b) is a front view of the game device 10 in the closed state, FIG. 3(c) is a right side view of the game device 10 in the closed state, and FIG. 3(d) is a back view of the game device 10 in the closed state. As shown in FIGS. 3(b) and 3(d), the L button 14G and the R button 14H are provided on the upper side surface of the lower housing 11. The L button 14G is provided on the left end portion of the upper surface of the lower housing 11, and the R button 14H is provided on the right end portion of the upper surface of the lower housing 11. For example, the L button 14G and the R button 14H can function as shutter buttons (image-capturing instruction buttons) of a camera. As shown in FIG. 3(a), a sound volume button 14I is provided on the left side surface of the lower housing 11. The sound volume button 14I is used for adjusting the sound volume of a speaker of the game device 10.

As shown in FIG. 3(a), a cover portion 11C which can be opened/closed is provided on the left side surface of the lower housing 11. A connector (not shown) for electrically connecting the game device 10 and a data storage external memory 45 with each other is provided inside the cover portion 110. The data storage external memory 45 is detachably connected to the connector. The data storage external memory 45 is used for, for example, recording (storing) data of an image captured by the game device 10. Note that the connector and the cover portion 110 thereof may be provided on the right side surface of the lower housing 11.

As shown in FIG. 3(d), a cover portion 11D which can be opened/closed is provided on the upper side surface of the lower housing 11. A connector (not shown) for electrically detachably connecting the game device 10 and an external memory 44 having a game program recorded therein with each other is provided inside the cover portion 11D. A predetermined game program is executed as the external memory 44 is connected to the game device 10. Note that the connector and the cover portion 110 thereof may be provided on another side surface (e.g., the right side surface, etc.) of the lower housing 11.

As shown in FIGS. 1 and 3(c), a first LED 16A for notifying the user of the ON/OFF status of the power supply of the game device 10 is provided on the lower side surface of the lower housing 11, and a second LED 16S for notifying the user of the wireless communication establishment status of the game device 10 is provided on the right side surface of the lower housing 11. The game device 10 can wirelessly communicate with other devices, and the first LED 16B is lit while the wireless communication is established. The game device 10 has a function of connecting to a wireless LAN by a scheme based on the IEEE 802.11. b/g standard, for example. A wireless switch 19 for enabling/disabling the wireless communication function is provided on the right side surface of the lower housing 11 (see FIG. 3(c)).

The microphone hole 18 is provided on the inner side surface of the lower housing 11. A microphone (see FIG. 6) as a sound input device to be described later is provided under the microphone hole 18, and the microphone detects sound from the outside of the game device 10.

Note that although not shown, the lower housing 11 accommodates a rechargeable battery serving as the power supply of the game device 10, and the battery can be charged through a terminal provided on a side surface (e.g., the upper side surface) of the lower housing 11.

(Description of Upper Housing)

Next, a configuration of the upper housing 21 will be described. As shown in FIGS. 1 to 3, the upper LCD (Liquid Crystal Display) 22, an outer camera 23 (a left-eye camera 23a and a right-eye camera 23b), an inner camera 24, a 3D adjustment switch 25, and the 3D indicator 26 are provided in the upper housing 21. Hereinafter, these components will be described in detail.

As shown in FIG. 1, the upper LCD 22 is accommodated in the upper housing 21. The upper LCD 22 has a landscape-oriented shape and is placed so that the long-side direction thereof coincides with the long-side direction of the upper housing 21. The upper LCD 22 is placed in the center of the upper housing 21 with respect to the left-right direction (the x-axis direction shown in FIG. 1). The area of the screen of the upper LCD 22 is set to be larger than the area of the screen of the lower LCD 12. Specifically, the screen of the upper LCD 22 is set to be wider than the screen of the lower LCD 12. That is, the proportion of the horizontal width in the aspect ratio of the screen of the upper LCD 22 is set to be larger than the proportion of the horizontal width in the aspect ratio of the screen of the lower LCD 12.

The screen of the upper LCD 22 is provided on an inner side surface (main surface) 21B of the upper housing 21, and the screen of the upper LCD 22 is exposed through the opening provided in the upper housing 21. As shown in FIG. 2, the inner side surface of the upper housing 21 is covered with a transparent screen cover 27. The screen cover 27 protects the screen of the upper LCD 22 and makes the upper LCD 22 integral with the inner side surface of the upper housing 21, thus giving a sense of unity. The number of pixels of the upper LCD 22 may be, for example, 640 dots×200 dots (horizontal× vertical). Note that although the upper LCD 22 is a liquid crystal display device in the present embodiment, a display device using EL (Electro Luminescence), etc., may be used, for example. A display device of any resolution may be used as the upper LCD 22.

The upper LCD 22 is a display device capable of displaying a stereoscopically viewable image. In the present embodiment, the left-eye image and the right-eye image are displayed using substantially the same display area. Specifically, the upper LCD 22 is a display device of such a scheme that the left-eye image and the right-eye image are displayed alternately in the horizontal direction by a predetermined unit (e.g., by columns). Alternatively, the upper LCD 22 may be a display device of such a scheme that the left-eye image and the right-eye image are displayed alternately in time division. In the present embodiment, the upper LCD 22 is a display device that enables stereoscopic viewing with naked eyes. A display device of a lenticular type or a parallax barrier type is used so that the left-eye image and the right-eye image displayed alternately in the horizontal direction can be seen separately by the left eye and the right eye, respectively. In the present embodiment, the upper LCD 22 is of the parallax barrier type. The upper LCD 22 displays an image that can be stereoscopically viewed by naked eyes (stereoscopic image) by using the right-eye image and the left-eye image. That is, the upper LCD 22 can display a stereoscopic image (stereoscopically viewable image) that has a stereoscopic feel to the user by allowing the left eye of the user to perceive the left-eye image and the right eye of the user the right-eye image using a parallax barrier. With the upper LCD 22, the parallax barrier can be disabled, and when the parallax barrier is disabled, an image can be two-dimensionally displayed (a two-dimensionally viewable image can be displayed, in an opposite sense to the stereoscopic viewing described above). Thus, the upper LCD 22 is a display device that can be switched between a stereoscopic display mode where a stereoscopically viewable image is displayed and a two-dimensional display mode where an image is two-dimensionally displayed (a two-dimensionally viewable image is displayed). The display mode switching is done with the 3D adjustment switch 25 to be described later.

The cuter camera 23 is provided on an outer side surface (the back surface opposite to the main surface on which the upper LCD 22 is provided) 21D of the upper housing 21, and is a stereo camera whose image-capturing direction is the normal direction to the outer side surface 21D. The outer camera 23 includes two cameras, i.e., the left-eye camera 23a and the right-eye camera 23b. The left-eye camera 23a and the right-eye camera 23b are placed so that their image-capturing directions are parallel to each other. The left-eye camera 23a and the right-eye camera 23b each include an image-capturing element (e.g., a COD image sensor, a CMOS image sensor, etc.) having a predetermined resolution, and a lens.

As shown by broken lines in FIG. 1 and solid lines in FIG. 3(b), the left-eye camera 23a and the right-eye camera 23b of the outer camera 23 are arranged so as to be parallel to the horizontal direction of the screen of the upper LCD 22. That is, the left-eye camera 23a and the right-eye camera 23b are arranged so that the straight line connecting the two cameras with each other is parallel to the horizontal direction of the screen of the upper LCD 22. The broken lines representing the left-eye camera 23a and the right-eye camera 23b in FIG. 1 mean that the left-eye camera 23a and the right-eye camera 23b are present on the outer side surface which is on the opposite side from the inner side surface of the upper housing 21. The left-eye camera 23a and the right-eye camera 23b are located on the left side and on the right side, respectively, when the user views the screen of the upper LCD 22 from the front side as shown in FIG. 1. The interval between the left-eye camera 23a and the right-eye camera 23b is set to be about equal to the interval between eyes of a human, and may be set in the range of 30 mm to 70 mm, for example. Note that the interval between the left-eye camera 23a and the right-eye camera 23b is not limited to this range. In other embodiments, the interval between the two cameras 23a and 23b may be variable.

The left-eye camera 23a and the right-eye camera 23b are placed at positions that are in symmetry with respect to the center of the upper LCD 22 (the upper housing 21) in the left-right direction. That is, the left-eye camera 23a and the right-eye camera 23b are placed at positions that are in symmetry with respect to a line that bisects the upper LCD 22 left and right. The left-eye camera 23a and the right-eye camera 23b are placed on the reverse side of an upper portion of the upper housing 21 at positions above the upper edge of the screen of the upper LCD 22 in a state where the upper housing 21 is open. That is, the left-eye camera 23a and the right-eye camera 23b are placed on the outer side surface of the upper housing 21 above the upper edge of the screen of the upper LCD 22 as the upper LCD 22 is projected onto the outer side surface.

Thus, as the two cameras of the outer camera 23 are placed at positions that are in symmetry with respect to the center of the upper LCD 22 in the left-right direction, the image-capturing direction of the outer camera 23 can be made to coincide with the viewing direction of the user when the user is looking straight at the upper LCD 22. Since the outer camera 23 is placed at positions on the reverse side above the upper edge of the screen of the upper LCD 22, the outer camera 23 and the upper LCD 22 do not interfere with each other inside the upper housing 21. Therefore, as compared with a case where the outer camera 23 is placed on the reverse side of the screen of the upper LCD 22, the upper housing 21 can be made thinner.

The inner camera 24 is a camera which is provided on the inner side surface (main surface) 21B of the upper housing 21 and whose image-capturing direction is the normal direction to the inner side surface. The inner camera 24 includes an image-capturing element (e.g., a CCD image sensor, a CMOS image sensor, etc.) having a predetermined resolution, and a lens.

As shown in FIG. 1, the inner camera 24 is placed in an upper portion of the upper housing 21 above the upper edge of the screen of the upper LCD 22 in a state where the upper housing 21 is open, and is placed at the central position of the upper housing 21 in the left-right direction. Specifically, as shown in FIGS. 1 and 3(b), the inner camera 24 is placed on the inner side surface of the upper housing 21 at a position in the middle between the left and right cameras (the left-eye camera 23a and the right-eye camera 23b) of the outer camera 23 on the reverse side therefrom. That is, the inner camera 24 is provided in the middle between the left and right cameras provided on the outer side surface of the upper housing 21 as the left and right cameras are projected onto the inner side surface of the upper housing 21. A broken line shown in FIG. 3(b) represents the inner camera 24 present on the inner side surface of the upper housing 21.

Thus, the inner camera 24 captures an image in the direction opposite to that of the outer camera 23. The inner camera 24 is provided on the inner side surface of the upper housing 21 at a position in the middle between the left and right cameras of the outer camera 23 on the reverse side therefrom. Thus, when the user is looking straight at the upper LCD 22, it is possible to capture an image of the face of the user from the front by the inner camera 24. Since the left and right cameras of the outer camera 23 and the inner camera 24 do not interfere with each other inside the upper housing 21, the upper housing 21 can be made thin.

The 3D adjustment switch 25 is a sliding switch, and is a switch used for switching between the display modes of the upper LCD 22 as described above. The 3D adjustment switch 25 is used for adjusting the stereoscopic feel of the stereoscopically viewable image (stereoscopic image) displayed on the upper LCD 22. As shown in FIGS. 1 to 3, the 3D adjustment switch 25 is provided at an edge portion of inner side surface and right side surface of the upper housing 21, and is provided at such a position that the 3D adjustment switch 25 can be seen when the user is looking straight at the upper LCD 22.

Figure 4:
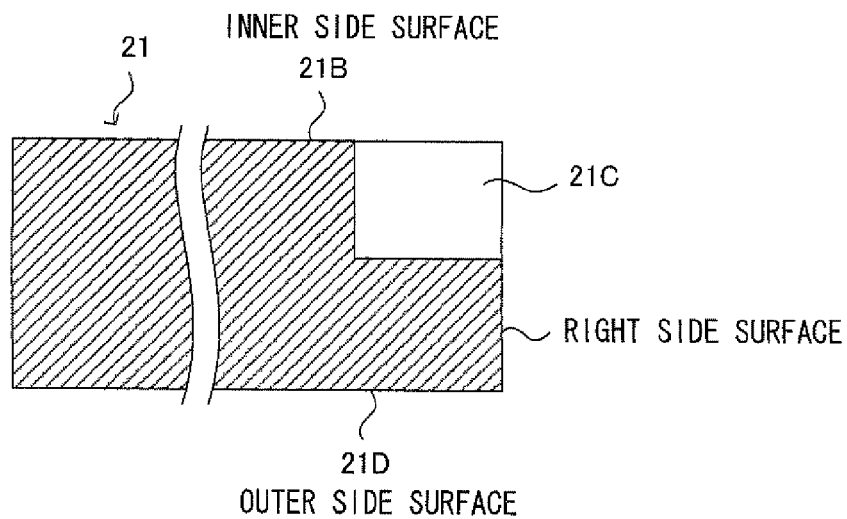
FIG. 4 is a cross-sectional view taken along line A-A' of an upper housing shown in FIG. 1.

FIG. 4 is a cross-sectional view of the upper housing 21 shown in FIG. 1, taken along line A-A'. As shown in FIG. 4, a depressed portion 21C is formed in a right edge portion of the inner side surface of the upper housing 21, and the 3D adjustment switch 25 is provided in the depressed portion 21C. The 3D adjustment switch 25 is placed so that it can be seen from the front surface and the right side surface of the upper housing 21, as shown in FIGS. 1 and 2. A slider 25a of the 3D adjustment switch 25 can be slid to any position in a predetermined direction (up-down direction), and the display mode of the upper LCD 22 is set in accordance with the position of the slider 25a.

Figure 5A:
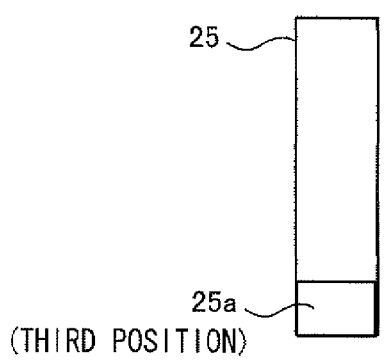
FIG. 5A is a diagram showing a slider of a 3D adjustment switch being present at the lowermost point (third position)
Figure 5B:
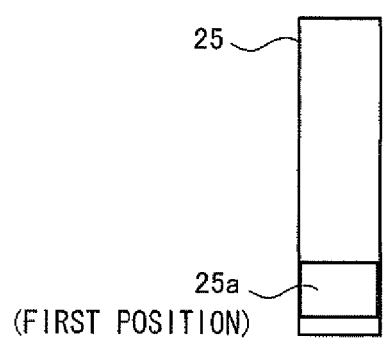
FIG. 5B is a diagram showing the slider of the 3D adjustment switch being present at a position above the lowermost point (first position)
Figure 5C:
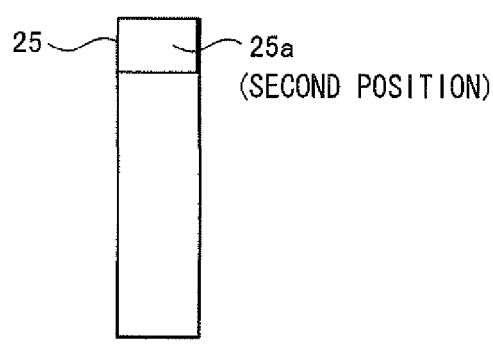
FIG. 5C is a diagram showing the slider of the 3D adjustment switch being present at the uppermost point (second position)

FIGS. 5A to 5C are diagrams showing how the slider 25a of the 3D adjustment switch 25 is slid. FIG. 5A is a diagram showing the slider 25a of the 3D adjustment switch 25 being present at the lowermost point (third position). FIG. 5B is a diagram showing the slider 25a of the 3D adjustment switch 25 being present at a position above the lowermost point (first position). FIG. 5C is a diagram showing the slider 25a of the 3D adjustment switch 25 being present at the uppermost point (second position).

When the slider 25a of the 3D adjustment switch 25 is present at the lowermost point position (third position) as shown in FIG. 5A, the upper LCD 22 is set to the two-dimensional display mode, and a two-dimensional image is displayed on the screen of the upper LCD 22. On the other hand, when the slider 25a is present between the position shown in FIG. 5B (the position above the lowermost point (first position)) to the position shown in FIG. 5C (the position at the uppermost point (second position)), the upper LCD 22 is set to the stereoscopic display mode. In this case, a stereoscopically viewable image is displayed on the screen of the upper LCD 22. When the slider 25a is present between the first position and the second position, how a stereoscopic image is seen is adjusted in accordance with the position of the slider 25a. The slider 25a of the 3D adjustment switch 25 is fixed at the third position while it can be slid to any position in the up-down direction between the first position and the second position. For example, the slider 25a at the third position is secured by a protruding portion (not shown) projecting in the lateral direction shown in FIG. 5A from a side surface of the 3D adjustment switch 25 so that it is not slid upwards past the third position unless a force greater than or equal to a predetermined force is applied upwards.

The 3D indicator 26 shows whether the upper LCD 22 is in the stereoscopic display mode. The 3D indicator 26 is an LED, and is lit when the stereoscopic display mode of the upper LCD 22 is enabled. As shown in FIG. 1, the 3D indicator 26 is provided on the inner side surface of the upper housing 21, and is provided in the vicinity of the screen of the upper LCD 22. Therefore, when the user is looking straight at the screen of the upper LCD 22, the user easily sees the 3D indicator 26. Therefore, the user can easily recognize the display mode of the upper LCD 22 while seeing the screen of the upper LCD 22.

Speaker holes 21E are provided on the inner side surface of the upper housing 21. Sound from a speaker 43 to be described later is outputted from the speaker holes 21E.

[Internal Configuration of Game Device 10]

Figure 6:
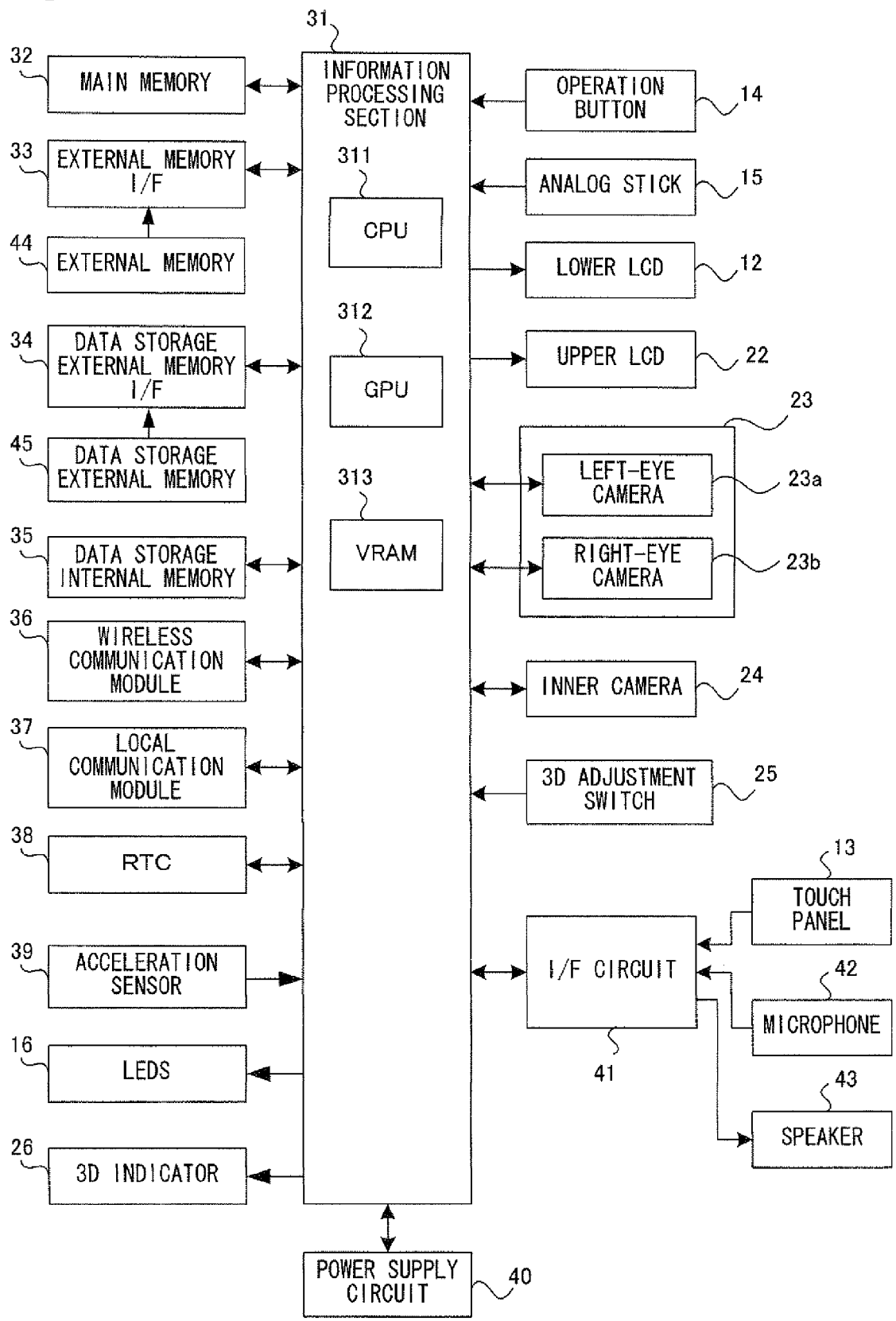
FIG. 6 is a block diagram showing an internal configuration of the game device.

Next, referring to FIG. 6, an internal electrical configuration of the game device 10 will be described. FIG. 6 is a block diagram showing an internal configuration of the game device 10. As shown in FIG. 6, the game device 10 includes electronic components such as an information processing section 31, a main memory 32, an external memory interface (external memory I/F) 33, a data storage external memory I/F 34, a data storage internal memory 35, a wireless communication module 36, a local communication module 37, a real time clock (RTC) 38, an acceleration sensor 39, a power supply circuit 40, and an interface circuit (I/F circuit) 41, in addition to the components described above. These electronic components are mounted on an electronic circuit substrate and accommodated in the lower housing 11 (or in the upper housing 21).

The information processing section 31 is an information processing section including a CPU (Central Processing Unit) 311 for executing a predetermined program, a GPU (Graphics Processing Unit) 312 for performing image processes, etc. In the present embodiment, a program for performing a predetermined process is stored in a memory (e.g., the external memory 44 connected to the external memory I/F 33, or the data storage internal memory 35) in the game device 10. The CPU 311 of the information processing section 31 executes the program, thereby performing a process according to the program (e.g., an image-capturing process, an image display process to be described later, etc.). Note that a program to be executed by the CPU 311 of the information processing section 31 may be obtained from other devices through communication with the other devices. The information processing section 31 includes a VRAM (Video RAM) 313. The GPU 312 of the information processing section 31 produces an image in accordance with an instruction from the CPU 311 of the information processing section 31, and renders the image in the VRAM 313. The GPU 312 of the information processing section 31 outputs the image rendered in the VRAM 313 to the upper LCD 22 and/or the lower LCD 12, thereby displaying the image on the upper LCD 22 and/or the lower LCD 12.

The main memory 32, the external memory I/F 33, the data storage external memory I/F 34, and the data storage internal memory 35 are connected to the information processing section 31. The external memory I/F 33 is an interface for detachably connecting the external memory 44. The data storage external memory I/F 34 is an interface for detachably connecting the data storage external memory 45.

The main memory 32 is a volatile storage section used as a work area and a buffer area for (the CPU 311 of) the information processing section 31. That is, the main memory 32 temporarily stores various data used for the process based on the program, and temporarily stores a program obtained from the outside (the external memory 44, other devices, etc.). In the present embodiment, a PSRAM (Pseudo-SRAM) is used as the main memory 32, for example.

The external memory 44 is a non-volatile storage section for storing a program to be executed by the information processing section 31. The external memory 44 is formed by a read-only semiconductor memory, for example. When the external memory 44 is connected to the external memory I/F 33, the information processing section 31 can load the program stored in the external memory 44. A predetermined process is performed by executing the program loaded by the information processing section 31. The data storage external memory 45 is formed by a non-volatile readable/writable memory (e.g., a NAND-type flash memory), and is used for storing predetermined data. For example, the data storage external memory 45 stores images captured by the outer camera 23 and images captured by other devices. When the data storage external memory 45 is connected to the data storage external memory I/F 34, the information processing section 31 can load images stored in the data storage external memory 45, and display the images on the upper LCD 22 and/or the lower LCD 12.

The data storage internal memory 35 is formed by a readable/writable non-volatile memory (e.g., a NAND-type flash memory), and is used for storing predetermined data. For example, the data storage internal memory 35 stores data and programs downloaded through wireless communication via the wireless communication module 36.

The wireless communication module 36 has a function of connecting to a wireless LAN by a scheme based on the IEEE 802.11.b/g standard, for example. The local communication module 37 has a function of performing wireless communication with game devices of the same type by a predetermined communication scheme (e.g., a unique protocol or infrared communication). The wireless communication module 36 and the local communication module 37 are connected to the information processing section 31. The information processing section 31 can transmit/receive data to/from other devices via the Internet by using the wireless communication module 36, and can transmit/receive data to/from other game devices of the same type by using the local communication module 37.

The acceleration sensor 39 is connected to the information processing section 31. The acceleration sensor 39 detects magnitudes of acceleration (linear acceleration) in the directions of straight lines along the directions of three axes (xyz axes). The acceleration sensor 39 is provided inside the lower housing 11. The acceleration sensor 39 detects magnitudes of linear acceleration of the axes, where the x axis is the long-side direction of the lower housing 11, the y axis is the short-side direction of the lower housing 11, and the z axis is the direction vertical to the inner side surface (main surface)

of the lower housing 11, as shown in FIG. 1. For example, the acceleration sensor 39 may be one of those of types that are available from Analog Devices, Inc. or STMicroelectronics N.V. Note that while the acceleration sensor 39 is assumed to be an electrostatic capacitance type acceleration sensor, for example, other types of acceleration sensors may be used. The acceleration sensor 39 may be an acceleration sensor which performs detection in one or two axial directions. The information processing section 31 receives data (acceleration data) representing acceleration detected by the acceleration sensor 39 to detect the orientation and the movement of the game device 10.

The RTC 38 and the power supply circuit 40 are connected to the information processing section 31. The RTC 38 counts the time, and outputs it to the information processing section 31. The information processing section 31 calculates the current time (date) based on the time counted by the RTC 38. The power supply circuit 40 controls the power from the power supply (the rechargeable battery described above accommodated in the lower housing 11) of the game device 10, and supplies power to components of the game device 10.

An I/F circuit 41 is connected to the information processing section 31. A microphone 42 and the speaker 43 are connected to the I/F circuit 41. Specifically, the speaker 43 is connected to the I/F circuit 41 via an amplifier, not shown. The microphone 42 detects sound of the user, and outputs a sound signal to the I/F circuit 41. The amplifier amplifies the sound signal from the I/F circuit 41, and outputs the sound from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on a sound signal, or converts a sound signal to sound data of a predetermined format. The touch panel control circuit produces touch position data of a predetermined format based on a signal from the touch panel 13, and outputs it to the information processing section 31. The touch position data represents the coordinates of the position on the input surface of the touch panel 13 at which an input has been made. Note that the touch panel control circuit reads a signal from the touch panel 13 and produces the touch position data once per a predetermined period of time. The information processing section 31 can know the position at which an input has been made on the touch panel 13 by obtaining the touch position data.

The operation button 14 includes the operation buttons 14A to 14L, and is connected to the information processing section 31. Operation data representing the input status of each of the operation buttons 14A to 14I (whether it has been pressed) is outputted from the operation button 14 to the information processing section 31. The information processing section 31 obtains the operation data from the operation button 14 to perform a process in accordance with the input on the operation button 14.

The lower LCD 12 and the upper LCD 22 are connected to the information processing section 31. The lower LCD 12 and the upper LCD 22 display images in accordance with an instruction from (the GPU 312 of) the information processing section 31. In the present embodiment, the information processing section 31 displays a stereoscopic image (stereoscopically viewable image) on the upper LCD 22 using a right-eye image and a left-eye image.

Specifically, the information processing section 31 is connected to the LCD controller (not shown) of the upper LCD 22, and controls ON/OFF of the parallax barrier for the LCD controller. When the parallax barrier of the upper LCD 22 is ON, a right-eye image and a left-eye image stored in the VRAM 313 of the information processing section 31 are outputted to the upper LCD 22. More specifically, the LCD controller reads out the right-eye image and the left-eye image from the VRAM 313 by alternately repeating the process of reading out one line of pixel data of the right-eye image in the vertical direction and the process of reading out one line of pixel data of the left-eye image in the vertical direction. Thus, the right-eye image and the left-eye image are each divided into strip-shaped images each including pixels arranged in one vertical line, and an image is displayed on the screen of the upper LCD 22 in which the separated strip-shaped images of the right-eye image and the separated strip-shaped images of the left-eye image alternate with each other. Then, as the image is viewed by the user via the parallax barrier of the upper LCD 22, the right-eye image is viewed by the right eye of the user and the left-eye image by the left eye of the user. As described above, a stereoscopically viewable image is displayed on the screen of the upper LCD 22. The outer camera 23 and the inner camera 24 are connected to the information processing section 31. The outer camera 23 and the inner camera 24 capture images in accordance with instructions of the information processing section 31, and output captured image data to the information processing section 31.

The 3D adjustment switch 25 is connected to the information processing section 31. The 3D adjustment switch 25 transmits to the information processing section 31 an electrical signal in accordance with the position of the slider 25a.

The 3D indicator 26 is connected to the information processing section 31. The information processing section 31 controls lighting of the 3D indicator 26. For example, when the upper LCD 22 is in the stereoscopic display mode, the information processing section 31 lights the 3D indicator 26. This has been description of the internal configuration of the game device 10.

[Outline of Stereoscopic Image Display Process in Game Device 10]

An outline of the stereoscopic image display process performed in the game device 10 will now be described. In the present embodiment, the game device 10 stereoscopically displays an image produced by using an augmented reality technique. That is, the game device 10 displays an image (synthesized image) obtained by synthesizing together an image (captured image) captured by the outer camera 23 and an image (virtual image) of a virtual object produced virtually, on the upper LCD 22 capable of producing stereoscopic display.

Figure 7:
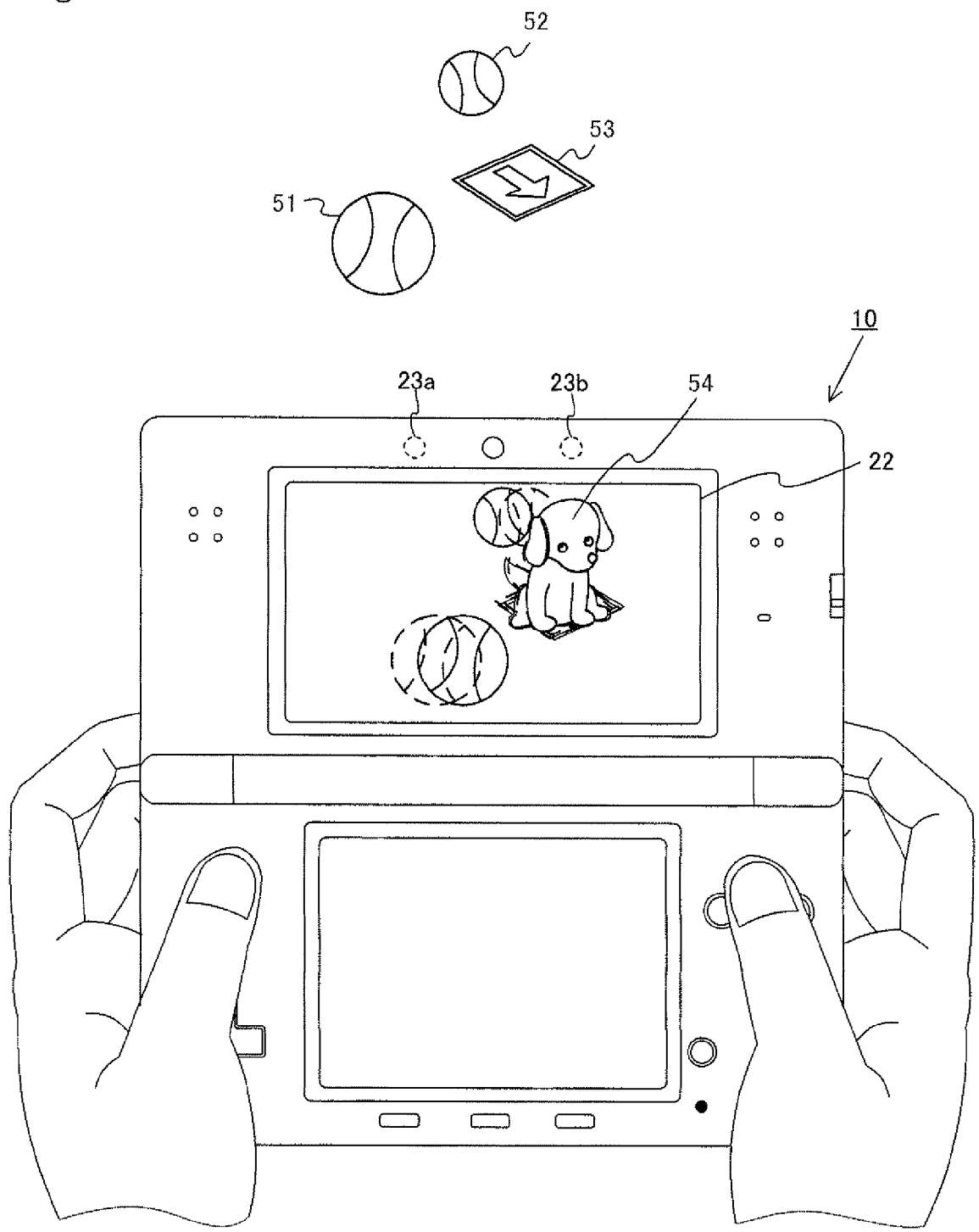
FIG. 7 is a diagram showing how a game device 10 of the present embodiment is used.
Figure 8:
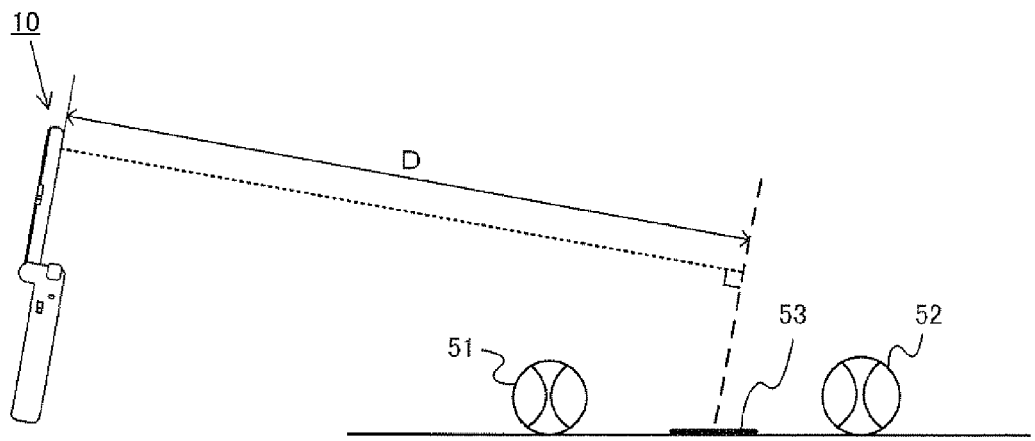
FIG. 8 is a diagram showing the positional relationship between the game device 10 and balls 51 and 52 and a marker 53.

FIG. 7 is a diagram showing how the game device 10 of the present embodiment is used. In FIG. 7, the outer camera 23 (the left-eye camera 23a and the right-eye camera 23b) is used to capture an image of balls 51 and 52 and the marker 53 which are real objects. FIG. 8 is a diagram showing the positional relationship between the game device 10 and the balls 51 and 52 and the marker 53. As shown in FIG. 8, the ball 51 is placed closest to the game device 10, the marker 53 is placed second closest to the game device 10, and the ball 52 is placed farthest away from the game device 10. The marker 53 is an image-capture object used in augmented reality techniques. That is, the game device 10 calculates the positional relationship between the marker 53 and the outer camera 23 and synthesizes an image of a virtual object 54 produced based on the calculated positional relationship with the captured image, thereby producing a synthesized image.

As shown in FIG. 7, a synthesized image obtained by an augmented reality technique is stereoscopically displayed on the upper LCD 22. That is, a synthesized image for the left eye (a solid line shown in FIG. 7) and a synthesized image for the right eye (a dotted line shown in FIG. 7) are both displayed on the screen of the upper LCD 22 as shown in FIG. 7. Note that FIG. 7 shows how both of the synthesized images for the left eye and the right eye are displayed on the screen of the upper LCD 22. In practice, however, for a user positioned approximately in front of the upper LCD 22, the left-eye image is viewed only by the left eye of the user and the right-eye image is viewed only by the right eye of the user due to the parallax barrier described above. As a result, the user can stereoscopically view the image. An outline of the process until a synthesized image obtained using an augmented reality technique is stereoscopically displayed will now be described with reference to FIGS. 9 to 13.

Note that an image captured by the left-eye camera 23a will be hereinafter referred to as a "left captured image" and an image captured by the right-eye camera 23b as a "right captured image". An image of a virtual object to be synthesized with a left captured image will be referred to as a "left virtual image" and an image of a virtual object to be synthesized with a right captured image as a "right virtual image". An image obtained by synthesizing together a left captured image and a left virtual image will be referred to as a "left synthesized image" and an image obtained by synthesizing together a right captured image and a right virtual image as a "right synthesized image".

(Determination of Display Area)

In the present embodiment, the game device 10 determines an area (display area) of which each captured image is to be displayed on the screen at an appropriate position in order to adjust the zero-parallax distance in stereoscopic display. Note that while display objects stereoscopically displayed are each displayed with a parallax in accordance with the depth position when stereoscopically displayed, those display objects displayed with zero parallax appear on the display plane (appear in focus). That is, objects with smaller parallaxes in stereoscopic display appear to be present at the position of the display plane with respect to the depth direction (appear in focus), while objects with larger parallaxes appear to be present nearer or farther with respect to the position of the display plane.

In the present specification, the depth (distance in the viewing direction) from the point of view to a display object appearing on the display plane when stereoscopically displayed as described above is referred to as the "zero-parallax distance". Note that the zero-parallax distance can be set either in the real space or in the virtual space. That is, the zero-parallax distance is the "distance (in the image-capturing direction of the virtual camera) from the virtual camera in the virtual space to a point where it appears to be present at the position of the display plane in stereoscopic display", or the "distance (in the image-capturing direction of the outer camera 23) from the outer camera 23 in the real space to a point where it appears to be present on the display plane in stereoscopic display". Particularly, one of the points along the zero-parallax distance that is on the median line between the two camera positions (the positions of the two outer cameras 23a and 23b or the positions of the two virtual cameras) is referred to as the "zero-parallax point". With the game device 10, by adjusting the display area of each captured image, it is possible to adjust the parallax on display of an object included in the captured image, and to thereby adjust the zero-parallax distance in stereoscopic display. Note that "parallax" as used in the present specification means the difference between the position of an object included in the right-eye image and the position of the object included in the left-eye image.

Here, in the present embodiment, the game device 10 produces stereoscopic display so that the zero-parallax distance is a distance in accordance with the distance from the outer camera 23 to the marker 53 (the distance D shown in FIG. 8). That is, the game device 10 determines the display area of each captured image so that the zero-parallax distance is a distance in accordance with the distance D. For example, the game device 10 can produce stereoscopic display so that the parallax of the marker 53 is zero by determining the display area so that the zero-parallax distance is equal to the distance D. Then, the marker 53 appears to be located on the screen with respect to the depth direction (the marker 53 appears in focus). Note that in practice, since the marker 53 has a size, the parallax will not be zero across the entire area of the marker 53. However, the present embodiment performs a process for the purpose of producing display such that an object that is present at the zero-parallax distance has zero parallax, and although the parallax is not zero across the entire area of the object, it can be said that the object as a whole is displayed with zero parallax. Therefore, the present specification uses the expression "an object that is present at the zero-parallax distance is displayed with zero parallax". Note that in the present embodiment, when determining the display area, the game device 10 actually calculates a distance in the virtual space that corresponds to the distance D (the virtual marker distance d to be described later), and determines the zero-parallax distance based on the calculated distance. Then, the display area is adjusted (the parallax is adjusted) so that the determined zero-parallax distance is reached. The details of the method for calculating the virtual marker distance d and the method for determining the display area from the zero-parallax distance will be described later.

Figure 9:
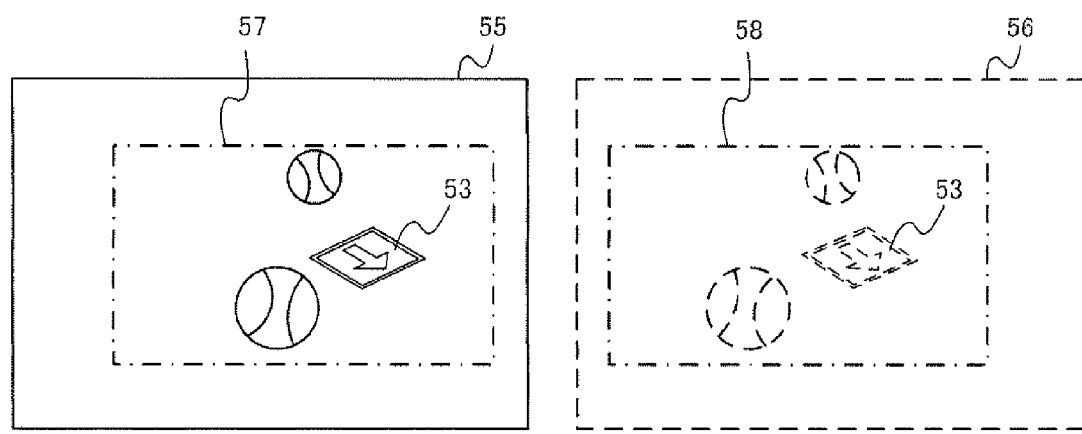
FIG. 9 is a diagram showing captured images and display areas set therefor.
Figure 10:
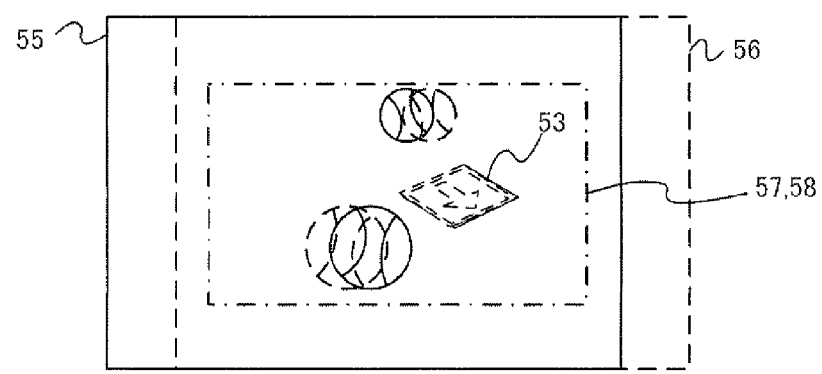
FIG. 10 is a diagram showing the captured images shown in FIG. 9 laid on each other so that their display areas are aligned with each other.

FIG. 9 is a diagram showing captured images and display areas set therein. FIG. 10 is a diagram showing the captured images shown in FIG. 9 laid on each other so that their display areas are aligned with each other. Note that in FIGS. 9 and 10, a left captured image 55 is represented by a solid line and a right captured image 56 is represented by a dotted line for ease of understanding of the figures.

For example, where the distance D from the outer camera 23 to the marker 53 is the zero-parallax distance, the game device 10 determines a display area 57 of the left captured image 55 and a display area 58 of the right captured image 56 so that the marker 53 in the left-eye image and that in the right-eye image are displayed on the screen at (substantially) the same position (so that the marker 53 has zero parallax on the screen). That is, the display areas 57 and 58 are determined so that the marker 53 in the left-eye image and that in the right-eye image are at (substantially) the same position (so that the marker 53 has zero parallax) in the display areas 57 and 58 as shown in FIGS. 9 and 10. Thus, stereoscopic display is produced in which the distance to the marker 53 is the zero-parallax distance. That is, when stereoscopic display is produced, the marker 53 appears to be present at a depth position (in the vicinity of) on the screen.

Note that the zero-parallax distance where stereoscopic display is produced using a left captured image and a right captured image varies in accordance with the positions of the display areas 57 and 58. Specifically, for the left captured image 55, as the amount (shift amount) by which the display area 57 is shifted to the right from the center of the left captured image 55 increases, the zero-parallax point in stereoscopic display moves nearer, and as the shift amount is smaller, the zero-parallax point moves farther away. For the right captured image 56, as the amount by which the display area 58 is shifted to the left from the center of the right captured image 56, the zero-parallax point moves nearer, and as the shift amount is smaller, the zero-parallax point moves farther away. When the display areas 57 and 58 are located at the centers of the captured images 55 and 56, respectively, the zero-parallax point is at infinity.

As described above, the game device 10 determines the positions of the display areas 57 and 58 in the captured images 55 and 56 so that the zero-parallax distance in stereoscopic display is a distance in accordance with the distance D from the outer camera 23 to the marker 53. Therefore, according to the present embodiment, as the game device 10 moves closer to the marker 53, the zero-parallax point moves nearer accordingly, and as the game device 10 moves away from the marker 53, the zero-parallax point moves farther away accordingly. Note that while an example where the position of the marker 53 is the zero-parallax point has been described with reference to FIGS. 9 and 10, the game device 10 can align the zero-parallax point not only with the position of the marker 53 but also with a position that is nearer (or farther) with respect to the marker 53 by a predetermined distance. Since the zero-parallax distance can be calculated as a distance in the real space or as a distance in the virtual space, the predetermined distance may be set as a distance in the real space or as a distance in the virtual space.

(Generation of Synthesized Image)

When the display areas 57 and 58 are determined as described above, the game device 10 synthesizes an image (virtual image) of the virtual object 54 with the captured images 55 and 56 in the display area, thereby producing a synthesized image. The process of producing a synthesized image is performed by an augmented reality technique using the marker 53. That is, the game device 10 calculates the positional relationship between the marker 53 and the outer camera 23, and produces a synthesized image by synthesizing the image of the virtual object 54 produced based on the calculated positional relationship with the captured image. Specifically, the position and the orientation of the virtual camera in the virtual space are determined based on the positional relationship, and the image of the virtual object 54 as seen from the virtual camera is synthesized with the captured image.

Figure 11:
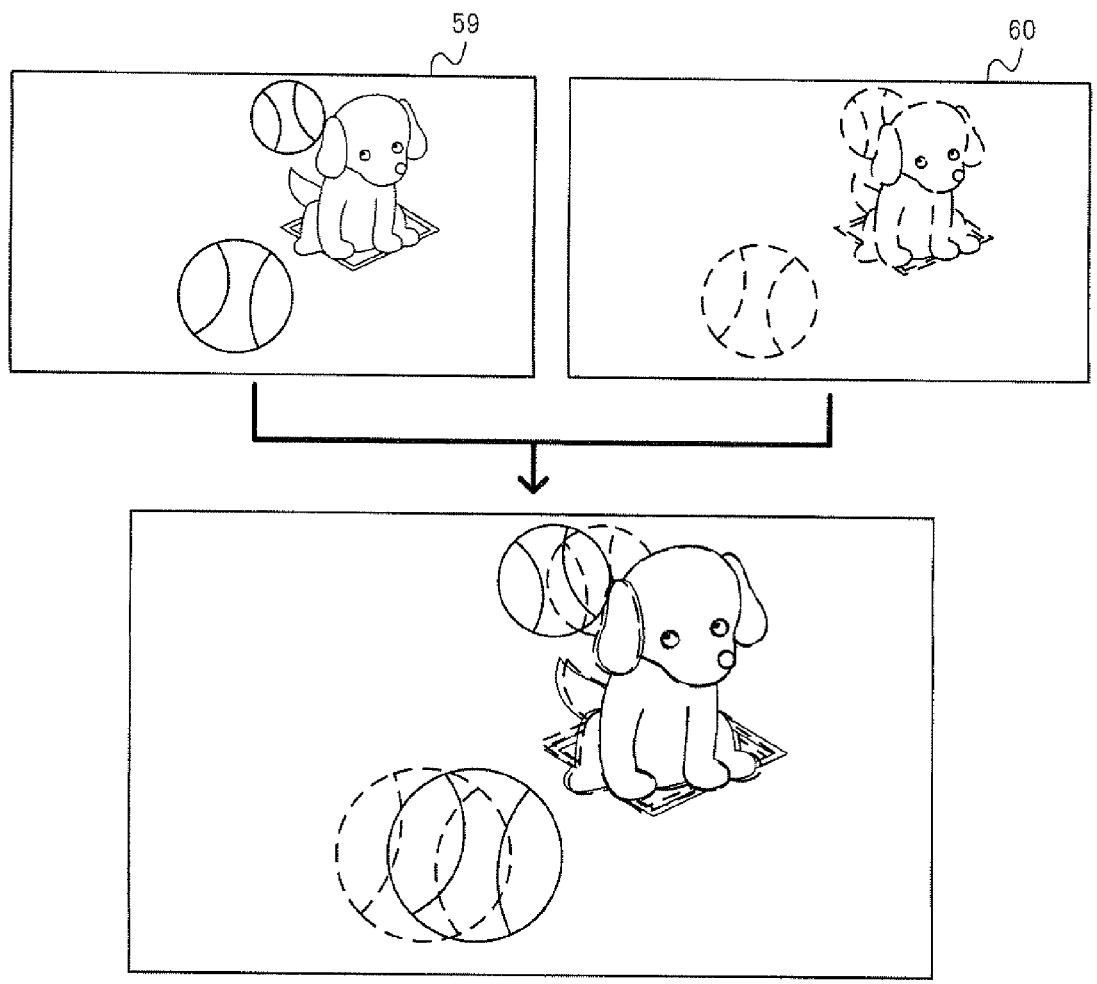
FIG. 11 is a diagram showing synthesized images.

Note that in the present embodiment, the process of synthesizing the virtual image is performed for each of the captured images 55 and 56, and virtual images synthesized with the captured images 55 and 56 are different from each other. That is, two virtual cameras are set in order to produce the virtual images. The image (left virtual image) of the virtual object to be synthesized with the left captured image 55 is produced based on a left virtual camera, and the image (right virtual image) of the virtual object to be synthesized with the right captured image 56 is produced based on a right virtual camera. Note that the position and the orientation of the left virtual camera are calculated based on the positional relationship between the left-eye camera 23a and the marker 53, and the position and the orientation of the right virtual camera are calculated based on the positional relationship between the right-eye camera 23b and the marker 53. As a result of producing two virtual images as described above, there is produced a left synthesized image 59 obtained by synthesizing the left virtual image with the left captured image 55 as shown in FIG. 11. There is also produced a right synthesized image 60 obtained by synthesizing the right virtual image with the right captured image 56. Note that while FIG. 11 shows a case where the virtual object 54 is displayed at the position of the marker 53, the display position of the virtual object 54 does not have to be the position of the marker 53. The game device 10 can display the virtual object 54 at a position in the vicinity of the marker 53 or can display the virtual object 54 at a position away from the marker 53.

(Stereoscopic Display)

The game device 10 produces stereoscopic display using the synthesized images 59 and 60 produced as described above. Specifically, the game device 10 produces display by alternately arranging the left synthesized image 59 and the right synthesized image 60 by vertical lines of the upper LCD 22. Note that FIGS. 7 and 11 show how both of the left-eye image (solid line) and the right-eye image (dotted line) are displayed on the screen of the upper LCD 22. In practice, however (where the parallax barrier of the upper LCD 22 is ON), for a user positioned approximately in front of the upper LCD 22, the left synthesized image 59 is viewed only by the left eye of the user and the right synthesized image 60 is viewed only by the right eye of the user due to the parallax barrier described above. As a result, the user can stereoscopically view the synthesized image. That is, for the user, the virtual object 54 with little parallax appears to be present in the vicinity of the display screen, the ball 51 appears to be popping out as compared with the virtual object 54, and the ball 52 appears to be farther away as compared with the virtual object 54.

As described above, according to the present embodiment, the game device 10 can present an image to the user as if the virtual object 54 were present in the real world by using an augmented reality technique. Through stereoscopic display, the game device 10 can stereoscopically display a synthesized image obtained by using an augmented reality technique.

In the present embodiment, since the game device 10 determines the zero-parallax distance in accordance with the distance D from the outer camera 23 to the marker 53, the zero-parallax point of the image to be stereoscopically displayed is automatically adjusted according to the distance D. Therefore, automatic adjustment can be made so that the zero-parallax point is located at the position of the marker 53 or in the vicinity of the marker 53, for example. Thus, since the zero-parallax point can be automatically aligned with the virtual object 54 which is displayed in the vicinity of the marker 53, the virtual object 54 can be displayed in a manner easy to view for the user. Since where an augmented reality technique is used as in the present embodiment, it is assumed that the user often carefully watches the virtual object 54, it is possible with the present embodiment to realize stereoscopic display that is easy to view for the user.

(Zooming Process)

In the present embodiment, when the zero-parallax distance (display area) is adjusted automatically, the display area may be shrunk and the image may be enlarged (zoomed in) as necessary. An outline of the process of shrinking the display area will now be described with reference to FIGS. 12 to 14.

Figure 12:
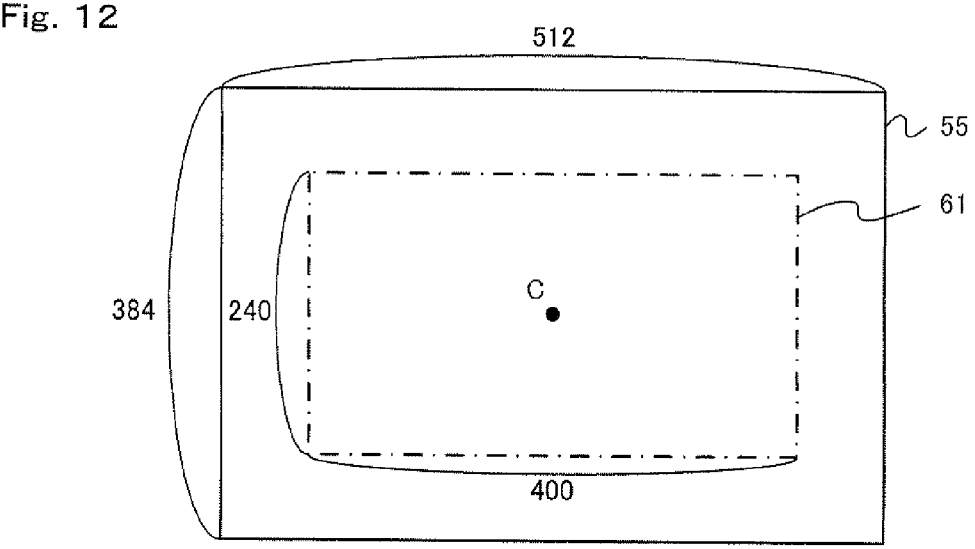
FIG. 12 is a diagram showing the relationship between a left captured image and a reference frame of a display area.

FIG. 12 is a diagram showing the relationship between the left captured image and the reference frame of the display area. As shown in FIG. 12, a reference frame 61 is set at the center of the left captured image 55 in the present embodiment. The reference frame 61 represents the reference position of the frame (a frame 62 shown in FIG. 13) for determining the display area. Note that it is assumed in the present embodiment that the left captured image 55 has s size of 384×512 dots (vertical×horizontal), and the reference frame 61 has a size of 240×400 dots (vertical×horizontal). Note that the sizes of the captured image and the reference frame and the position of the reference frame are the same between the right captured image 56 and the left captured image 55.

Figure 13:
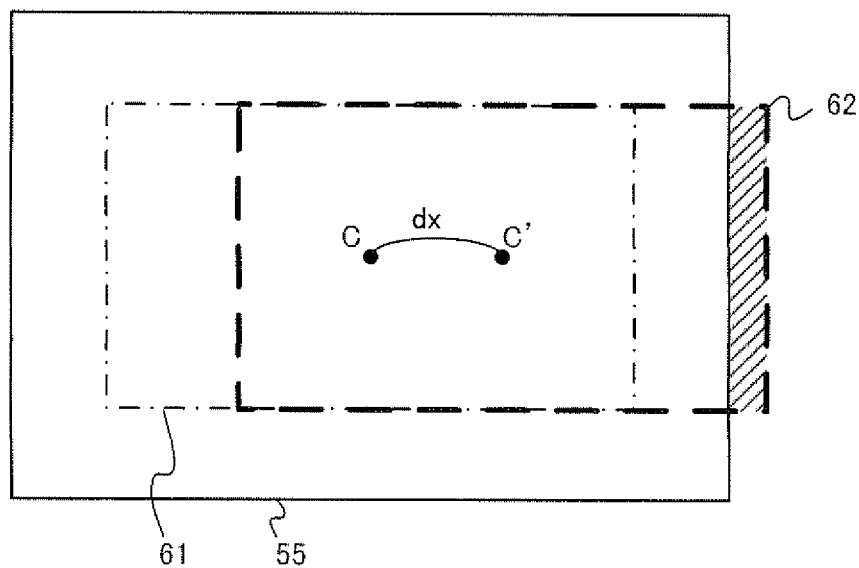
FIG. 13 is a diagram showing a left captured image in a case where the frame is shifted from the reference position.

FIG. 13 is a diagram showing a left captured image where the frame is shifted from the reference position. Where the display area is determined in accordance with the zero-parallax distance, the frame 62 is shifted to the right from the center (the position of the reference frame 61) for the left captured image 55 as described above. The shift amount dx of the frame 62 (the distance from the center point C of the left captured image 55 to the center point C' of the frame 62) is determined in accordance with the zero-parallax distance as described above, and the shift amount dx increases as the zero-parallax distance decreases. Note that for the right captured image 56, the magnitude of the shift amount dx is the same as that for the left captured image 55, and the shift direction is the left direction, opposite to that for the left captured image 55.

Here, when the shift amount dx of the frame 62 exceeds a predetermined value (56 dots in the example of FIG. 13), the frame 62 protrudes out of the left captured image 55 as shown in FIG. 13. Where the frame 62 is protruding out of the left captured image 55, if the area of the frame 62 is used as it is as the display area, the left captured image 55 will be absent for the portion protruding from the left captured image 55 (the hatched portion shown in FIG. 13). In this case, also for the right captured image 56, the frame is protruding out of the right captured image 56 so that the right captured image 56 will be absent for a left portion of the frame. Therefore, if the area of the frame 62 is used as it is as the display area, the opposite edge portions of the image to be displayed on the screen will not appear stereoscopically, resulting in an image that is not easy to view. With a method in which no captured image is displayed (black is displayed) for the opposite edge portions, the width of the captured image is narrowed, thereby giving an awkward feel to the user and failing to make effective use of the screen of the upper LCD 22.

Figure 14:
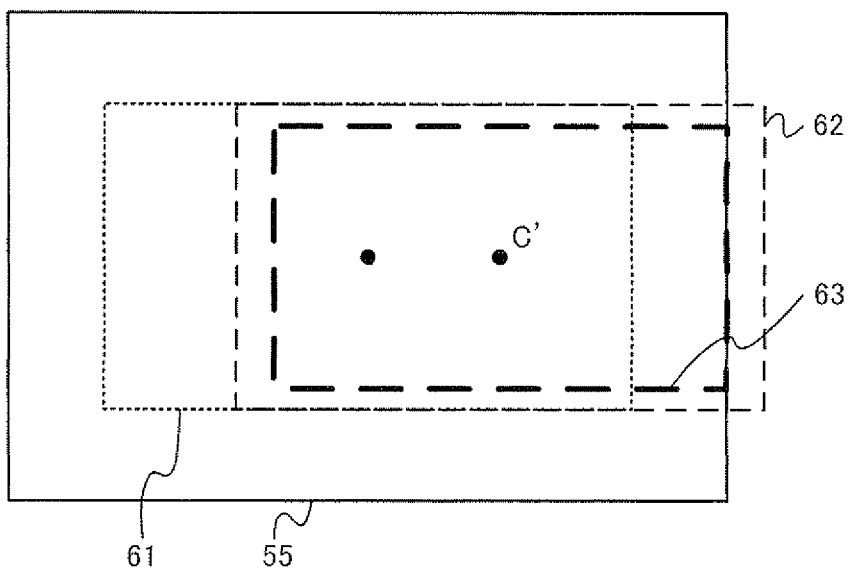
FIG. 14 is a diagram showing the left captured image with the frame shrunk.

In view of this, in the present embodiment, where the frame 62 is protruding out of the captured image, the game device 10 changes (decreases) the size of the frame 62 so that it fits inside the captured image. FIG. 14 is a diagram showing a left captured image of which the frame is shrunk. In FIG. 14, the frame 62 is the frame before the change, and a frame 63 is the frame after the change. In this case, the game device 10 shrinks the frame so that the protruding apices of the frame 62 are located on the circumference of the left captured image 55. In this process, the game device 10 shrinks the frame so that the center position (C') of the frame does not vary through the change. Note that also with the right captured image 56, as with the left captured image 55, the frame is shrunk so that the protruding apices of the frame 62 are located on the circumference of the right captured image 56 and so that the center position of the frame does not vary through the change. Thus, the image to be displayed on the upper LCD 22 is enlarged.

As described above, in the present embodiment, where the frame protrudes out of the captured image because the shift amount dx is large, the size of the frame is changed. Thus, the image is included across the entire display area of the captured images 55 and 56. Therefore, it is possible to prevent opposite edge portions of the screen from not appearing stereoscopically and the width of the image to be displayed from being narrowed, and it is possible to display an image that is easy to view in stereoscopic display.

Note that when the frame is shrunk as described above, the image displayed on the upper LCD 22 is zoomed in (enlarged). Here, the frame is shrunk when the shift amount dx is large, i.e., when the zero-parallax distance is short. That is, according to the present embodiment, since the image is zoomed in when looking at a nearby object, the user does not substantially experience an awkward feel even if it is zoomed in automatically, thus displaying an image that is easy to view.

If the frame is not shrunk in a case where the zero-parallax distance varies automatically as in the present embodiment, the zero-parallax distance varies automatically even if the user is making no operation, resulting in problems such as the opposite end portions of the screen no longer viewable stereoscopically, and the user may experience a very awkward feel. Therefore, where the zero-parallax distance varies automatically as in the present embodiment, it is particularly effective that the frame is shrunk automatically to prevent the above problems.

[Details of Process in Game Device 10]

Figure 15:
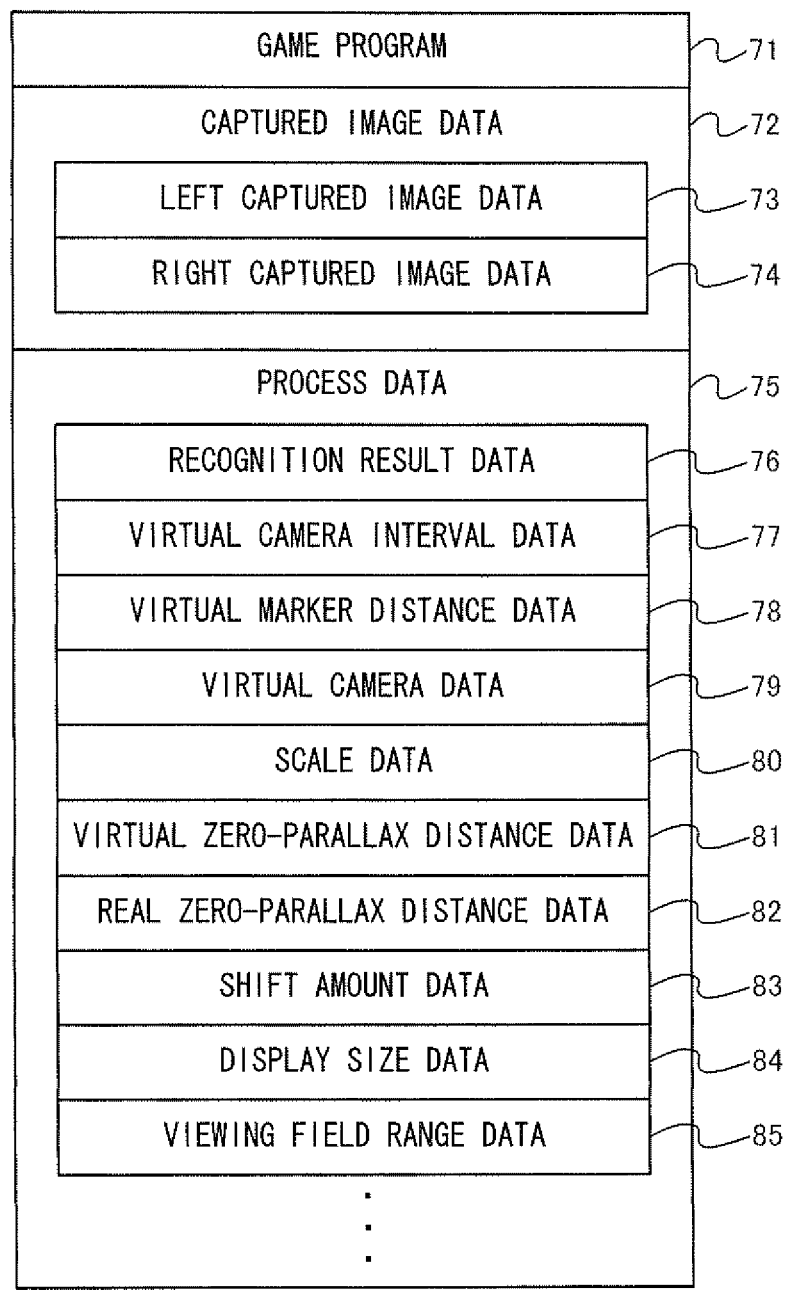
FIG. 15 is a diagram showing various data used in a process by a game program.

Next, the details of a game process to be performed by a game program will be described with reference to FIGS. 15 to 22. First, various data used in a game process will be described. FIG. 15 is a diagram showing various data used in a process by a game program. In FIG. 15, the main memory 32 of the game device 10 stores a game program 71, captured image data 72, process data 75, etc.

The game program 71 is a program for instructing the information processing section 31 of the game device 10 to perform a game process (FIG. 16) to be described later. The game program 71 is stored in the main memory 32 as a part or whole thereof is loaded from the external memory 44, the data storage internal memory 35, or the like, at an appropriate point in time. The game program 71 includes a program for advancing a predetermined game, and a program for performing a stereoscopic image display process.

The captured image data 72 is data representing an image (captured image) captured by the outer camera 23. The captured image data 72 includes left captured image data 73 and right captured image data 74. The left captured image data 73 is data representing an image (left captured image) captured by the left-eye camera 23a. The right captured image data 74 is data representing an image (right captured image) captured by the right-eye camera 23b. Note that for each of the captured image data 73 and 74, only a most recent piece of data may be stored or a predetermined number of most recent pieces of data may be stored.

The process data 75 is various data used in the game process. The process data 75 includes recognition result data 76, virtual camera interval data 77, virtual marker distance data 78, virtual camera data 79, scale data 80, virtual zero-parallax distance data 81, real zero-parallax distance data 82, shift amount data 83, display size data 84, and viewing field range data 85. Note that in addition to those described above, the process data 75 stores various data necessary for the game such as data relating to various objects appearing in the game (the virtual object 54, etc., shown in FIG. 7), sound data such as BGM, etc.

The recognition result data 76 is data representing results of a process (recognition process) of recognizing the marker 53 included in the captured image. Specifically, in the recognition process of the present embodiment, information (e.g., a view matrix of a virtual camera) representing the position and the orientation of the virtual camera is calculated as the recognition result. Note that a view matrix is a matrix that reflects the position and the orientation of the virtual camera, and specifically is a coordinate conversion matrix for converting coordinates represented in a marker coordinate system in the virtual space to coordinates represented in the virtual camera coordinate system based on the position and the orientation of the virtual camera. The marker coordinate system is a coordinate system using the position (referred to as the "virtual marker position") in the virtual space corresponding to the position of the marker 53 in the real space.

The recognition process is performed both for the left captured image and for the right captured image, and therefore the recognition process results are also calculated both for the left captured image and for the right captured image.

That is, the recognition result data 76 includes data representing the recognition results for the left virtual camera corresponding to the left-eye camera 23*a*, and data representing the recognition results for the right virtual camera corresponding to the right-eye camera 23*b*.

The virtual camera interval data 77 is data representing the distance (the virtual camera interval e) between the left virtual camera and the right virtual camera in the virtual space. The virtual camera interval e is calculated from the recognition result data 76 (the view matrices of the virtual cameras), the details of which will be described later.

The virtual marker distance data 78 is the distance (the virtual marker distance d) from the two virtual cameras to the virtual marker position in the virtual space. Here, the virtual marker distance d is the length of a component in the viewing direction of the virtual camera, out of the distance from the virtual camera to the corresponding marker position. The virtual marker distance d is calculated from the recognition result data 76 (the view matrices of the virtual cameras), details of which will be described later.

The virtual camera data 79 is data representing the position and the orientation of the virtual camera used for producing the virtual image. Here, while the recognition result data 76 represents the position and the orientation of the virtual camera (e.g., the view matrix of the virtual camera), as does the virtual camera data 79, the virtual camera data 79 is data that is obtained as a result of performing a predetermined correction process (step S14 to be described later) on the recognition result data 76 as necessary. As does the recognition result data 76, the virtual camera data 79 includes data representing the position and the orientation of the left virtual camera and data representing the position and the orientation of the right virtual camera. Note that although what is obtained by performing a predetermined correction process on the recognition result data 76 is used as the view matrix of the virtual camera (the virtual camera data 79) in the present embodiment, the recognition result data 76 may be used as it is as the view matrix, for example, in other embodiments. For example, the view matrices of the left and right virtual cameras may be set by using only the recognition result for the left captured image.

The scale data 80 is data representing the ratio (scale) between the length in the virtual space and the length in the real space. Note that in the present embodiment, the length (the real camera interval E) between the left-eye camera 23*a* and the right-eye camera 23*b* is known, and the above ratio is calculated as a ratio (E/e) of the virtual camera interval e with respect to the real camera interval E.

The virtual zero-parallax distance data 81 is data representing the zero-parallax distance (virtual zero-parallax distance) f in the virtual space corresponding to the zero-parallax distance F in the real space. In the present embodiment, the virtual zero-parallax distance f is determined in accordance with the virtual marker distance d, details of which will be described later.

The real zero-parallax distance data 82 is data representing the zero-parallax distance (real zero-parallax distance) F in the real space. In the present embodiment, the real zero-parallax distance F is calculated based on the virtual zero-parallax distance f and the scale s.

The shift amount data 83 is data representing the shift amount dx of the frame described above in the captured image. Specifically, the shift amount dx is the length from the center point of the captured image to the center point of the frame as shown in FIG. 13. The shift amount dx is calculated from the real zero-parallax distance F, details of which will be described later. Note that in the present embodiment, since the shift amount of the frame in the left captured image is equal to that in the right captured image, the shift amount data 83 can represent only one value as the shift amount dx. Note however that in other embodiments, the shift amount data 83 may separately include data representing the shift amount of the frame in the left captured image and data representing the shift amount of the frame in the right captured image.

The display size data 84 is data representing the size of the frame. Specifically, the display size data 84 represents the vertical and horizontal lengths (the numbers of dots) of the frame. Note that the size of the frame is a predetermined size (240×400 (vertical×horizontal)) if the shift amount dx is less than or equal to a predetermined value as described above, and is shrunk in accordance with the shift amount dx if the shift amount dx exceeds the predetermined value.

The viewing field range data 85 is data representing the viewing field range of the virtual camera. For example, the viewing field range of the virtual camera can be represented as the view volume of the virtual camera, and can be represented as the projection matrix of the virtual camera. Note that a projection matrix is a matrix used when rendering a virtual object as seen from a virtual camera, and is a coordinate conversion matrix for converting coordinates represented in the virtual camera coordinate system to coordinates represented in the screen coordinate system. Note that the viewing field range data 85 includes data representing the viewing field range (projection matrix) of the left virtual camera, and data representing the viewing field range of the right virtual camera.

Figure 16:
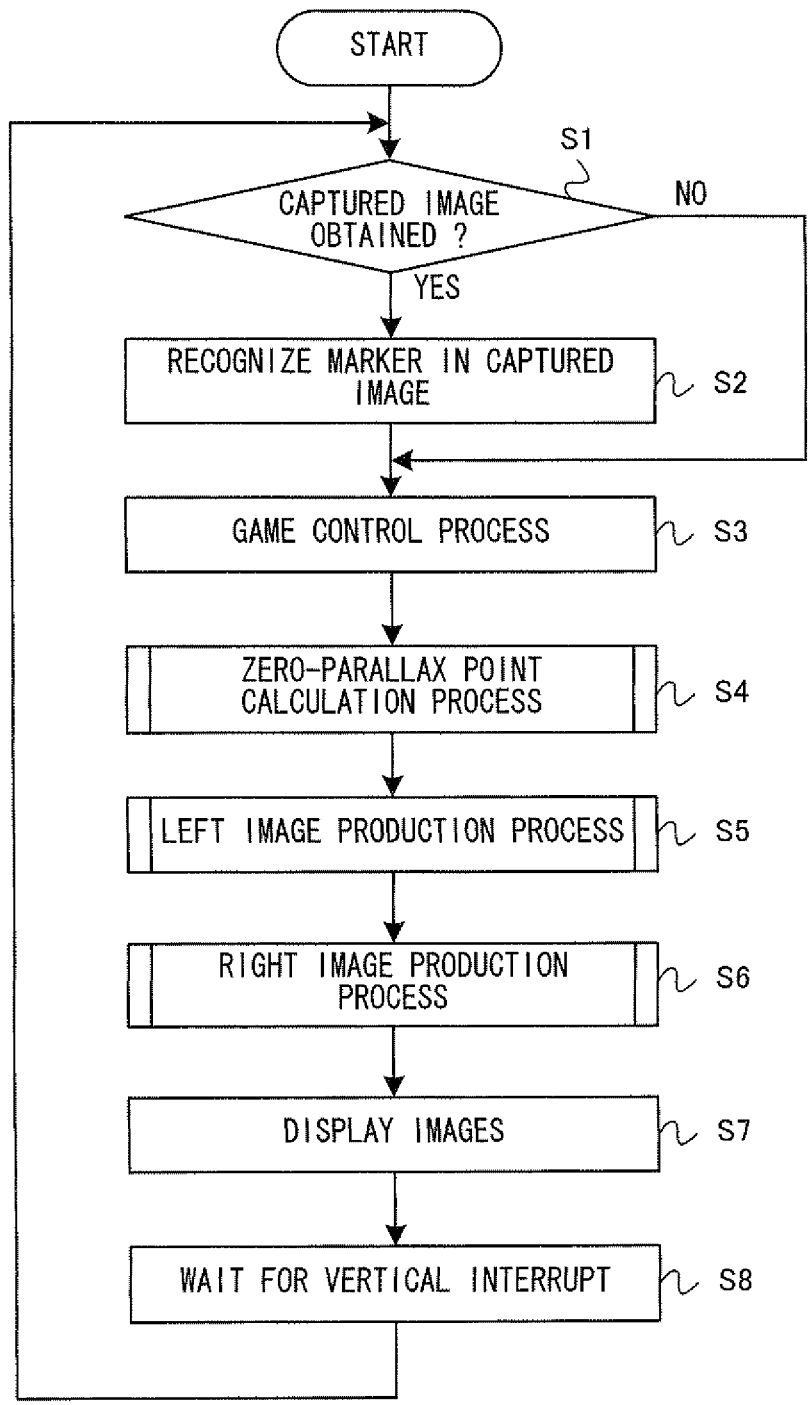
FIG. 16 is a main flow chart showing the flow of a game process to be performed in the game device.

Next, the details of the game process performed in the game device 10 will be described with reference to FIGS. 16 to 22. FIG. 16 is a main flow chart showing the flow of the game process performed in the game device 10. When the power supply of the game device 10 is turned ON, the information processing section 31 (the CPU 311) of the game device 10 executes a boot program stored in a ROM, not shown, thereby initializing units such as the main memory 32. Next, the game program stored in the data storage internal memory 35 is loaded to the main memory 32, and the CPU 311 of the information processing section 31 starts executing the game program. Thus, the process shown in FIG. 16 is started.

Figure 17:
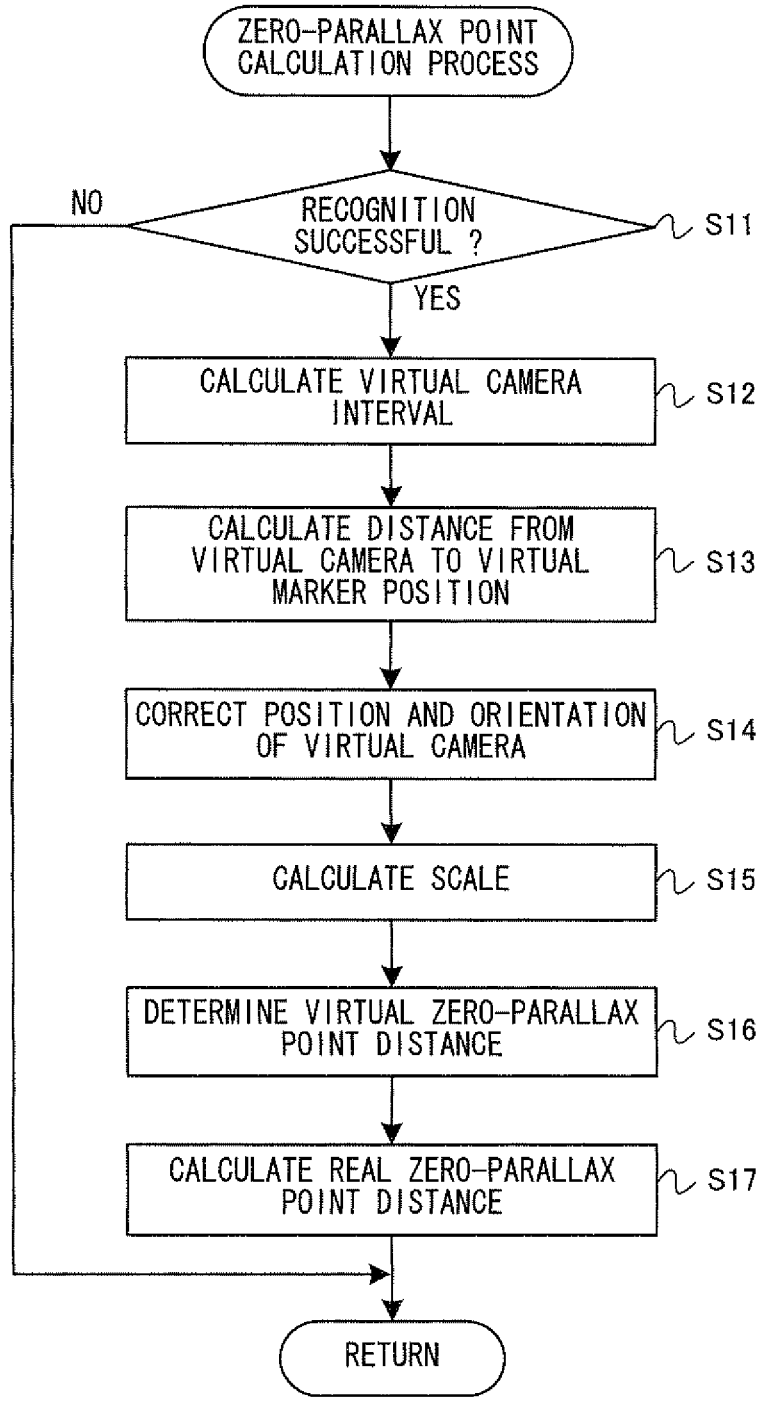
FIG. 17 is a flowchart showing the flow of a zero-parallax point calculation process (step S4) shown in FIG. 16.
Figure 20:
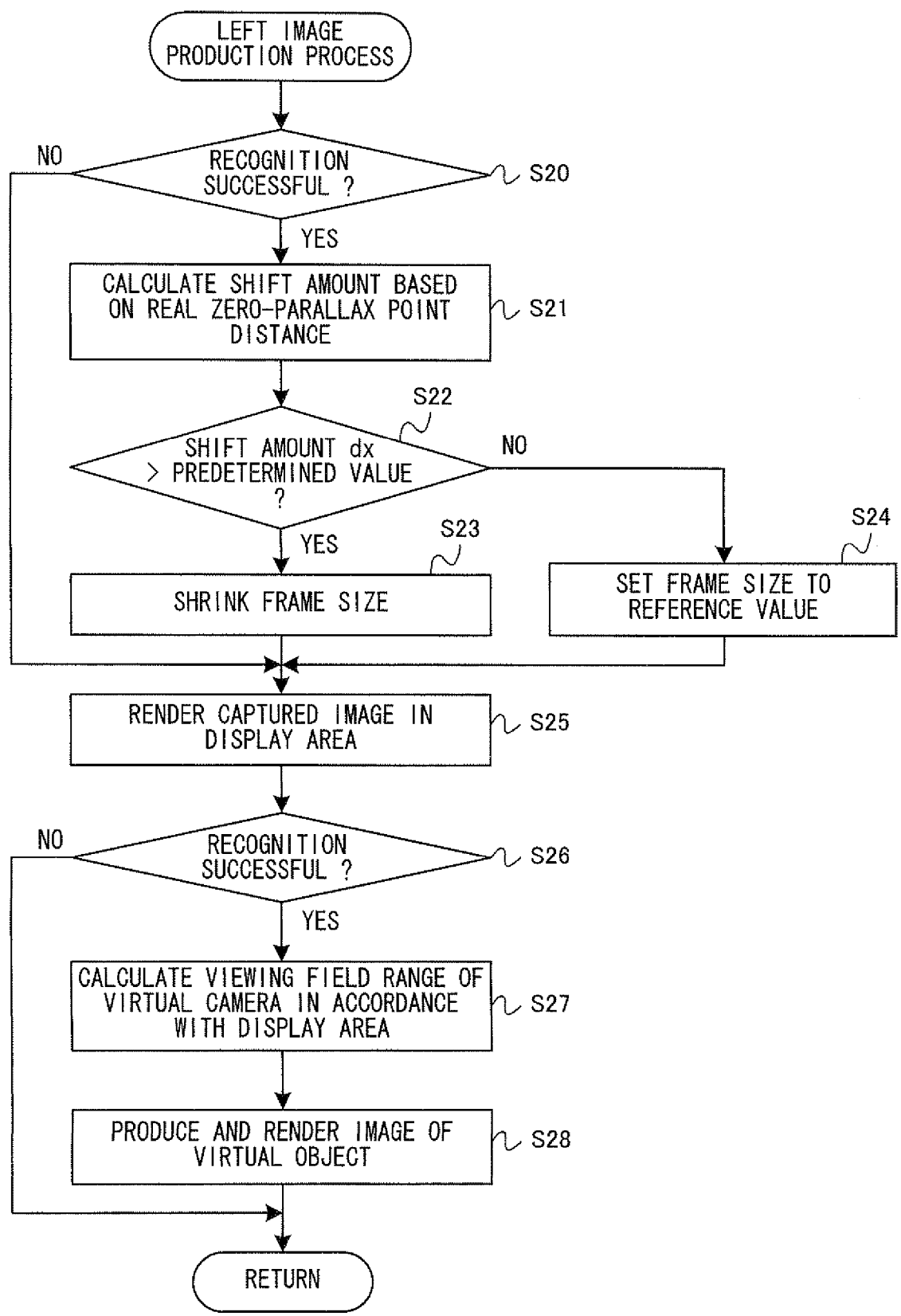
FIG. 20 is a flow chart showing the flow of a left image production process (step S5) shown in FIG. 16.

Note that processes shown in FIGS. 16, 17 and 20 are merely examples, and the order in which the steps are performed may be switched around as long as similar results are obtained. The variable values and threshold values used in decision steps are also merely examples, and other values may be employed as necessary. Although the processes of the steps of the flow charts shown in FIGS. 16, 17 and 20 are described to be performed by the CPU 311 in the present embodiment, some of the processes of the steps of the flow charts shown in FIGS. 16, 17 and 20 may be performed by a processor or a dedicated circuit other than the CPU 311.

In step S1, the CPU 311 determines whether a captured image has been obtained. That is, it is determined whether data of a captured image has been sent from the outer camera 23. Note that while the process loop through steps S1 to S8 is performed at a rate of once per frame period (1/60 sec) in the present embodiment, the outer camera 23 may send captured images at this rate or may send captured images with a lower frequency than this rate (about once per a few frame periods). If the determination result of step S1 is affirmative, the process of step S2 is performed. On the other hand, if the determination result of step S1 is negative, the process of step S3 is performed, skipping the process of step S2.

In step S2, the CPU 311 performs the process of recognizing the marker 53 in the captured image. Specifically, the CPU 311 determines whether the marker 53 is included in the captured image by a method such as pattern matching. Then, if the marker 53 is included in the captured image, the positional relationship between the marker 53 and the camera 23a or 23b is calculated based on the position and the direction of the marker 53 (e.g., the positions of the four vertices of the marker 53) in the captured image. Then, the positional relationship between a predetermined position corresponding to the position of the marker 53 in the virtual space and the virtual camera is made to correspond to the positional relationship, thereby calculating the position and the orientation of the virtual camera (view matrix). In this case, the data representing the position and the orientation of the virtual camera is stored in the main memory 32 as the recognition result data 76. On the other hand, if the marker 53 is not included in the captured image (if the marker 53 cannot be recognized), the data representing recognition failure (e.g., null value) is stored in the main memory 32 as the recognition result data 76. Note that in step S2, the recognition process is performed both for the left captured image and for the right captured image, and data representing the process result is obtained. The process of step S3 is performed, following step S2.

Note that it is assumed in the present embodiment that the recognition process of step S2 is performed within one frame period and performed within the process loop through steps S1 to S8. Here, for the recognition process, there may possibly be cases where it is difficult to complete one recognition process in one frame period. Therefore, in other embodiments, the recognition process does not always have to be performed with the same cycle as the display process which is performed with a cycle of one frame period. Then, only a part of the process of the entire recognition process may be performed in one iteration of the process of step S2. In this case, the process performed in one iteration of step S2 is adjusted to such an amount of process that a series of processes of steps S1 to S8 are completed within one frame period. That is, the recognition process may be performed in parallel, separately from the process loop through steps S1 to S8 (excluding S2), and may be performed while the CPU 311 is idling.

In step S3, the CPU 311 performs the game control process. The game control process is a process of advancing the game by making objects in the virtual space act in accordance with an input from the user (player), etc. Specifically, the game control process includes processes of controlling the action of the player character in accordance with an input from the user and controlling the action of an object (the virtual object 54 shown in FIG. 7) in accordance with a control rule defined in the game program 71. In the present embodiment, the action of the object is controlled based on the virtual marker position in the virtual space. That is, the CPU 311 performs a control of placing the object at the virtual marker position or moving the object around the virtual marker position. Note that while only one virtual object is placed in the virtual space in FIG. 7, a plurality of virtual objects may be placed, and the CPU 311 may control the action of a plurality of virtual objects. In the present embodiment, the CPU 311 may use the recognition result data 76 as a game input, in addition to operation results on the touch panel 13, the operation buttons 14A to 14L, and the analog stick 15. The process of step S4 is performed, following step S3.

In step S4, the CPU 311 performs a zero-parallax point calculation process. The zero-parallax point calculation process is a process of calculating the distance from the outer camera to the marker 53 based on the captured image, and calculating the zero-parallax distance (real zero-parallax distance) in accordance with the distance. The details of the zero-parallax point calculation process will now be described with reference to FIG. 17.

FIG. 17 is a flow chart showing the flow of the zero-parallax point calculation process (step S4) shown in FIG. 16. In the zero-parallax point calculation process, first, in step S11, the CPU 311 determines whether the recognition process of step S2 has succeeded. The determination of step S11 can be made based on whether the recognition result data 76 read out from the main memory 32 is data representing the position and the orientation of the virtual camera or data representing recognition failure. If the determination result of step S11 is affirmative, the processes of steps S12 to S17 are performed. On the other hand, if the determination result of step S11 is negative, the CPU 311 ends the zero-parallax point calculation process, skipping the processes of steps S12 to S17. Note that where the recognition process is not performed with a cycle of one frame period in other embodiments, the CPU 311 may determine whether the recognition process has been completed in step S11, and the processes of steps S12 to S17 may be performed only if the recognition process has been completed.

In step S12, the CPU 311 calculates the interval between the left virtual camera and the right virtual camera (the virtual camera interval e). The virtual camera interval e is calculated based on the recognition result data 76 which is the result of the recognition process. A method for calculating the virtual camera interval e will now be described with reference to FIG. 18.

Figure 18:
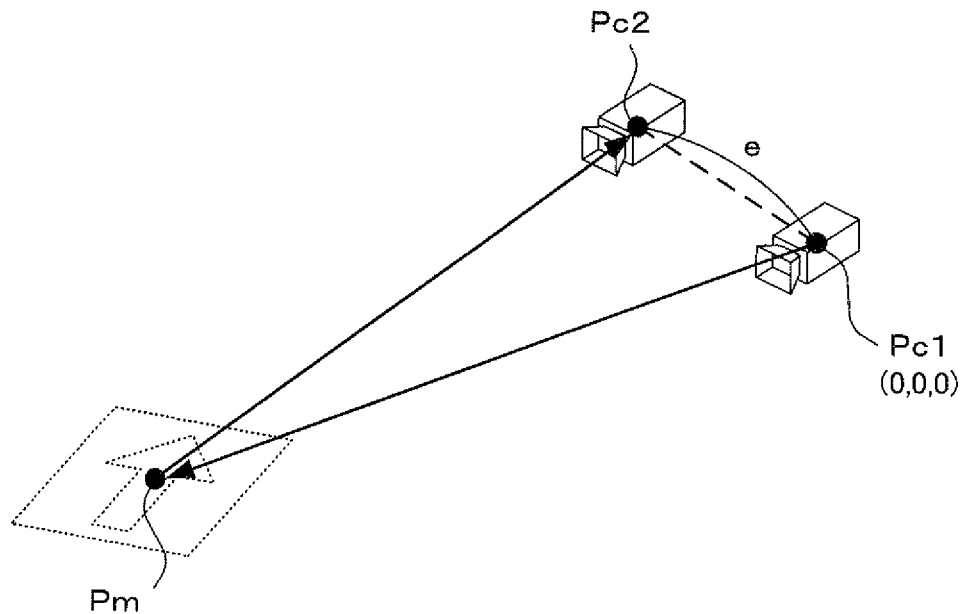
FIG. 18 is a diagram showing a virtual camera interval in a virtual space.

FIG. 18 is a diagram showing the virtual camera interval in the virtual space. In FIG. 18, the point Pc1 is the position of the left virtual camera, the point 2c2 is the position of the right virtual camera, and the point Pm is the virtual marker position (the position in the virtual space corresponding to the position of the marker 53 in the real space). Here, where the virtual marker position (the point Pm) is used as the origin (0,0,0), if the origin is multiplied by the inverse matrix of the view matrix of the left virtual camera (left view matrix), it is possible to obtain the position (the point Pc1) of the left virtual camera in the marker coordinate system. Similarly, where the virtual marker position (the point Pm) is used as the origin (0,0,0), if the origin is multiplied by the inverse matrix of the view matrix of the right virtual camera (right view matrix), it is possible to obtain the position (the point Pc2) of the right virtual camera in the marker coordinate system. Thus, since the position of the left virtual camera and the position of the right virtual camera in the marker coordinate system are known, it is possible to obtain the virtual camera interval e by obtaining the distance therebetween (FIG. 18). Note that the method for obtaining the virtual camera interval is not limited to the method described above, and the virtual camera interval may be calculated by regarding the camera position difference as being the difference between the position of the marker of which the image is captured by the right-eye camera and the position of the marker of which the image is captured by the left-eye camera, for example.

As a specific process in step S12 the CPU 311 reads out the recognition result data 76 from the main memory 32, and performs an arithmetic operation of calculating the difference between the result obtained by multiplying (0,0,0) by the inverse matrix of the left view matrix represented by the recognition result data 76 and the result obtained by multiplying (0,0,0) by the inverse matrix of the right view matrix. Then, the data representing the distance between the coordinates obtained by this arithmetic operation and the origin is stored in the main memory 32 as the virtual camera interval data 77. The process of step S13 is performed, following step S12.

Figure 19:
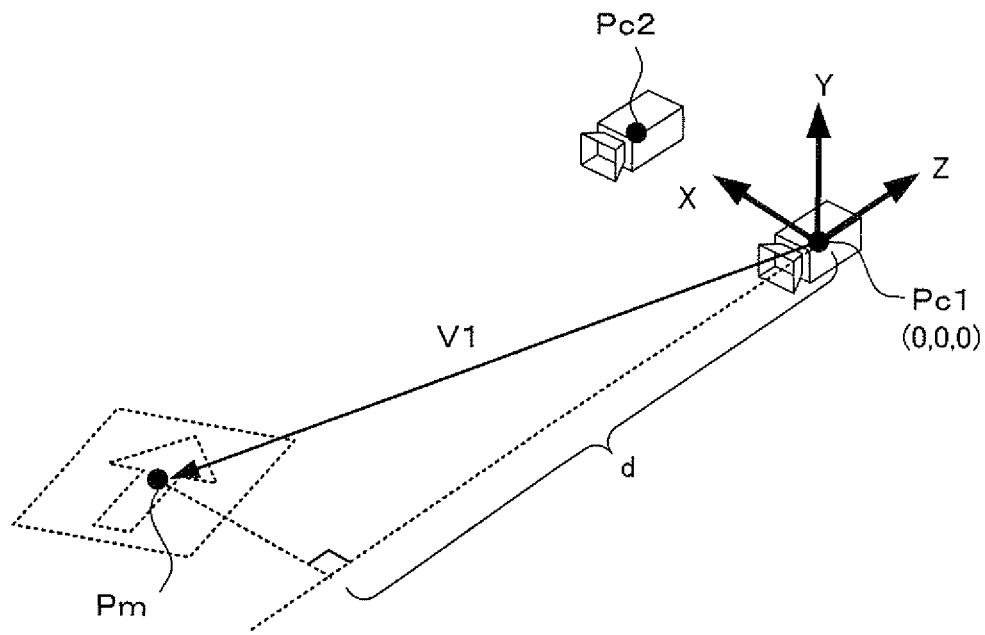
FIG. 19 is a diagram showing a virtual marker distance in a virtual space.

In step S13, the CPU 311 calculates the distance (the virtual marker distance d) from the virtual camera to the virtual marker position. FIG. 19 is a diagram showing the virtual marker distance in the virtual space. As shown in FIG. 19, the virtual marker distance d is the length of a component in the viewing direction of the virtual camera, out of the distance from the virtual camera to the corresponding marker position. Therefore, assuming that the viewing direction of the left virtual camera is the z-axis direction in the camera coordinate system of the left virtual camera (the XYZ coordinate system shown in FIG. 19), the virtual marker distance d is a value of the Z-axis component of the vector V1 whose start point is the position of the left virtual camera (the point Pc1) and whose end point is the virtual marker position (the point Pm). The vector V1 is calculated by multiplying the origin (0,0,0) by the left view matrix.

As a specific process in step S13, the CPU 311 reads out the recognition result data 76 from the main memory 32, and calculates the absolute value of the Z-axis component of the coordinates obtained by multiplying (0,0,0) by the left view matrix represented by the recognition result data 76 (coordinates representing the virtual marker position in the coordinate system of the left virtual camera). Then, the data representing the calculated absolute value is stored in the main memory 32 as the virtual marker distance data 78. Note that although an example where the virtual marker distance d is calculated using the view matrix of the left virtual camera has been described in the present embodiment, the CPU 311 may calculate the virtual marker distance d using the view matrix of the right virtual camera in other embodiments. The process of step S14 is performed, following step S13.

In step S14, the CPU 311 corrects the position and the orientation of the virtual camera. Here, there are errors in the precision of the recognition process and in the precision of the attachment of the cameras 23a and 23b. Therefore, if a virtual image is produced by using the position and the orientation of the virtual camera (view matrix) as they are, which are obtained as the process result of the recognition process, stereoscopic display of the virtual image may not be produced normally as a result of the positional relationship between the virtual cameras being different from the positional relationship between the cameras 23a and 23b. For example, if the virtual cameras face totally different directions, stereoscopic display of the virtual image is not produced normally. As described above, in step S14, the CPU 311 performs a predetermined correction on the view matrix obtained as the process result of the recognition process.

In the correction process of step S14, a correction is made so that the right virtual camera is located at a position at a distance of the virtual camera interval e in a predetermined direction from the left virtual camera with the same orientation as the orientation of the left virtual camera. Note that the predetermined direction is a direction corresponding to the direction from the left-eye camera 23a to the right-eye camera 23b in the real space from, and is the X-axis direction in the virtual camera coordinate system, for example. Specifically, the CPU 311 reads out the recognition result data 76 and the virtual camera interval data 77 from the main memory 32, and uses a matrix obtained by multiplying the left view matrix represented by the recognition result data 76 by the translation matrix (−e, 0,0) as the right view matrix (a matrix is calculated such that what is obtained by translating the left virtual camera at the origin of the coordinate system of the left virtual camera by (−e, 0,0) is the right virtual camera). Then, the data representing the right view matrix obtained by the multiplication and the data of the left view matrix represented by the recognition result data 76 are stored in the main memory 32 as the virtual camera data 79. The process of step S15 is performed, following step S14.

With the process of step S14, two virtual cameras are arranged with each other in a predetermined direction and the viewing directions are set to be the same. Then, two virtual cameras have an ideal relationship therebetween in terms of the position and the orientation, thereby enabling normal stereoscopic display. Note that while the CPU 311 corrects the position and the orientation of the right virtual camera using the left virtual camera as a reference in step S14, the position and the orientation of the left virtual camera may be corrected using the right virtual camera as a reference in other embodiments. In other embodiments the CPU 311 may produce a virtual image using the position and the orientation of the virtual camera as they are, which are obtained as a result of the recognition process, while omitting the process of step S14.

In step S15, the CPU 311 calculates the ratio (scale) of the virtual space with respect to the real space. As described above, the scale s is calculated as a ratio (E/e) of the virtual camera interval e with respect to the real camera interval E. Note that it is assumed that the real camera interval E is known and stored in the main memory 32, or the like. The CPU 311 reads out data representing the real camera interval E and the virtual camera interval data 77 from the main memory 32, and calculates the ratio of the virtual camera interval e with respect to the real camera interval E. The data representing the calculated ratio s is stored in the main memory 32 as the scale data 80. The process of step S16 is performed, following step S15.

In step S16, the CPU 311 determines the zero-parallax distance in the virtual space (virtual zero-parallax distance) based on the virtual marker distance d. The virtual zero-parallax distance may be determined in accordance with the virtual marker distance d, and it may for example be a distance obtained by adding or subtracting a predetermined value to/from the virtual marker distance d, a distance obtained by multiplying the virtual marker distance d with a predetermined value, or a distance equal to the virtual marker distance d. For example, the CPU 311 may calculate the virtual zero-parallax distance so that the position of a predetermined virtual object is the position of the zero-parallax point. That is, where the predetermined virtual object is placed at a position at a distance of L from the virtual marker position (with respect to the depth direction of the virtual camera), a distance obtained by adding the distance L to the virtual marker distance may be used as the virtual zero-parallax distance. The data representing the virtual zero-parallax distance determined in step S16 is stored in the main memory 32 as the virtual zero-parallax distance data 81. The process of step S17 is performed, following step S16.

In step S17, the CPU 311 calculates the zero-parallax distance (real zero-parallax distance) F in the real space. The real zero-parallax distance F can be obtained by multiplying the virtual zero-parallax distance f with the scale s. That is, the CPU 311 reads out the scale data 80 and the virtual zero-parallax distance data 81 from the main memory 32, and calculates a value obtained by multiplying the virtual zero-parallax distance f with the scale s. Then, the data representing the calculated value is stored in the main memory 32 as the real zero-parallax distance data 82. Thus, the zero-parallax distance in stereoscopic display is calculated. After step S17, the CPU 311 ends the zero-parallax point calculation process.

With the zero-parallax point calculation process, the CPU 311 calculates the virtual marker distance d corresponding to the distance from the outer camera 23 to the marker 53 (step S13), and calculates the real zero-parallax distance F so that it is a value in accordance with the virtual marker distance d (step S16, S17). Therefore, according to the present embodiment, since the real zero-parallax distance F is determined in accordance with the distance D from the outer camera 23 to the marker 53, the zero-parallax point of the image stereoscopically displayed is automatically adjusted according to the distance D. Thus, since the zero-parallax point can be automatically adjusted to the position of the virtual object displayed in the vicinity of the marker 53, the virtual object can be displayed in a manner easy to view.

Note that in the zero-parallax point calculation process, the CPU 311 calculates the real zero-parallax distance F after determining the virtual zero-parallax distance f from the virtual marker distance d. Here, in other embodiments, the CPU 311 may calculate the real zero-parallax distance F from the distance D after calculating the distance D from the outer camera 23 to the marker 53 in the real space from the virtual marker distance d. For example, where one intends to adjust the zero-parallax distance so that the position of the object in the virtual space is the position of the zero-parallax point, the method of determining the virtual zero-parallax distance f from the virtual marker distance d as in the present embodiment is preferred. On the other hand, where one intends to determine the zero-parallax distance using a length in the real space as a reference, e.g., where one intends to set the zero-parallax point at a position 10 cm nearer from the marker 53, the method of determining the real zero-parallax distance F from the distance D is preferred. That is, the CPU 311 may calculate the distance D by multiplying the virtual marker distance d with the scale s, and the distance obtained by subtracting (or adding) an intended adjustment amount (e.g. 10 cm) from/to the distance D may be used as the zero-parallax distance F. Then, a position away from the marker 53 by an actual distance in the real space can be used as the zero-parallax point. With either method, the zero-parallax distance F can be automatically adjusted in accordance with the distance from the outer camera 23 to the marker 53.

Although the CPU 311 calculates the real zero-parallax distance F without using the size of the marker 53 in the zero-parallax point calculation process, the real zero-parallax distance F may be calculated by a method using the size of the marker 53 in other embodiments. That is, where the size of the marker 53 is known, the CPU 311 can calculate the distance D from the camera 23a or 23b to the marker 53 by identifying the size of the marker 53 in the captured image in the recognition process (the value of the virtual marker distance d can be made to coincide with the value of the distance D if the size of the marker is taken into consideration when recognizing the marker and calculating the position and the orientation of the virtual camera (view matrix) in step S2). The CPU 311 may determine the real zero-parallax distance F in accordance with the calculated distance D. Note that since the real zero-parallax distance F is calculated without using the size of the marker 53 in the present embodiment, the marker 53 of any size can be used, and therefore there is an advantage that an augmented reality technique is made more general-purpose in the game device 10.

Referring back to FIG. 16, the process of step S5 is performed, following the zero-parallax point calculation process of step S4. In step S5, the CPU 311 performs a left image production process. The left image production process is a process of producing a left-eye image (left synthesized image) used in stereoscopic display. The details of the left image production process will now be described with reference to FIG. 20.

FIG. 20 is a flow chart showing the flow of the left image production process (step S5) shown in FIG. 16. In the left image production process, first, in step S20, the CPU 311 determines whether the recognition process of step S2 has succeeded. The process of step S20 is the same as the process of step S11 described above. If the determination result of step S20 is affirmative, the process of step S21 is performed. On the other hand, if the determination result of step S20 is negative, the process of step S25 is performed, skipping the processes of steps S21 to S24. Note that where the recognition process is not performed with a cycle of one frame period in other embodiments, the CPU 311 may determine whether the recognition process has been completed in step S20, and the processes of steps S21 to S24 may be performed only if the recognition process has been completed.

In step S21, the CPU 311 calculates the shift amount dx of the display area (frame) in the captured image based on the real zero-parallax distance F. That is, the shift amount dx is calculated so that the position of the zero-parallax point in stereoscopic display is the position of the real zero-parallax distance F. The method for calculating the shift amount dx will now be described with reference to FIG. 21.

Figure 21:
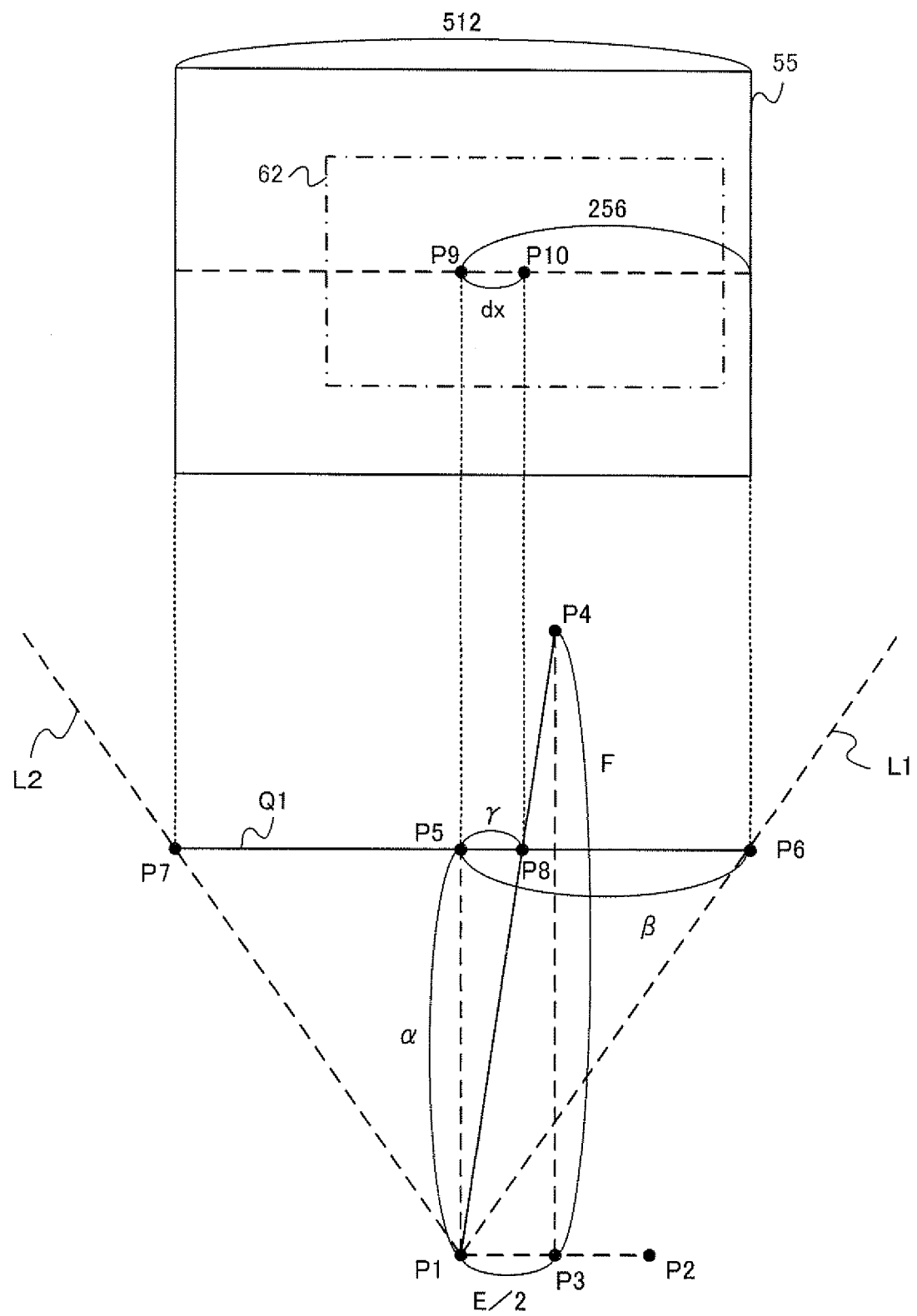
FIG. 21 is a diagram showing the correspondence between a real space and the plane of a captured image.

FIG. 21 is a diagram showing the correspondence between the real space and the plane of the captured image. In FIG. 21, the points P1-P8 represent positions in the real space, and the points P9 and 210 represent positions in the plane of the captured image. The point P1 represents the position of the left-eye camera 23a, and the point P2 represents the position of the right-eye camera 23b. The point P3 is the median between the two the cameras 23a and 23b. Therefore, the length of the line segment 21-P3 is ½ the real camera interval (F) (E/2). The point 24 is the position of the zero-parallax point in stereoscopic display, and is a position that is at a distance of the real zero-parallax distance F from the point P3 in the image-capturing direction of the left-eye camera 23a. The straight lines L1 and L2 represent the image-capturing range (viewing field range) of the left-eye camera 23a.

In FIG. 21, the plane Q1 is set at a position at a distance of an arbitrary distance α in the image-capturing direction from the left-eye camera 23a. The point P5 is the intersection between a straight line extended from the point 91 in the image-capturing direction and the plane Q1. The point P6 is the intersection between the straight line L1 and the plane Q1, and the point P7 is the intersection between the straight line L2 and the plane Q1. Where the plane Q1 is set as described above, the range of the line segment P6-P7 in the plane Q1 corresponds to the horizontal width (512 dots) of the left captured image 55. The position of the point P5 on the plane Q1 corresponds to the center position of the left captured image 55.

Here, in order to set the frame 62 so that the position of the zero-parallax point in stereoscopic display is the position of the distance F, the left and right display areas may be set so as to satisfy the condition that "the point at the position of the zero-parallax distance is displayed at the same position (on the left-eye image and on the right-eye image)". Note that the point at the position of the zero-parallax distance is the point P4, for example. That is, in order to satisfy the condition above, the display areas can be set so that the point P4 is displayed at the same position. For this, the center position of the frame 62 (the point P10) may correspond to the point P8 on the plane Q1 as shown in FIG. 21. Here, the point P8 is the intersection between a straight line from the left-eye camera 23a (the point P1) to the position of the zero-parallax point (the point P4) and the plane Q1. Thus, by calculating the shift amount dx such that the correlation shown in FIG. 21 is satisfied, it is possible to satisfy the condition above and set the position of the zero-parallax point in stereoscopic display to be the position of the distance F.

In FIG. 21, the ratio (dx:256) of the shift amount dx with respect to the length "256" of one half of the horizontal width of the left captured image 55 is equal to the ratio (γ:β) of the length γ of the line segment P5-P8 with respect to the length β of the line segment P5-P6 in the plane Q1. Therefore, the shift amount dx can be expressed as shown in Expression (1).

$$dx = \gamma \times 256/\beta \tag{1}$$

In FIG. 21, the ratio (proportion) (γ:α) of the length γ of the line segment P5-P8 with respect to the length a of the line segment P1-P5 is equal to the ratio (E/2:F) of the length "E/2" of the line segment P1-P3 with respect to the length F of the line segment P3-P4. Therefore, the length γ can be expressed as shown in Expression (2).

$$\gamma = \alpha \times (E/2)/F \tag{2}$$

From Expressions (1) and (2) above, dx can be expressed as shown in Expression (3).

$$dx = (\alpha/\beta) \times (E/2) \times (1/F) \times 256 \tag{3}$$

In Expression (3) above, the value of the real camera interval E is known as described above, and is stored in the main memory 32, or the like. The value of "α/β" can be obtained from the angle of view of the left-eye camera 23a and is known. It is assumed that this value is also stored in the main memory 32, or the like. The variable F is calculated as the real zero-parallax distance F in the zero-parallax point calculation process. Therefore, it is possible to calculate the shift amount dx using Expression (3) above.

As a specific process in step S21, the CPU 311 reads out the real zero-parallax distance data 82 from the main memory 32, and reads out data representing the real camera interval E and "α/β" from the main memory 32. Then, the shift amount dx is calculated by substituting the read-out values into Expression (3) above. The data representing the calculated shift amount dx is stored in the main memory 32 as the shift amount data 83. The process of step S22 is performed, following step S21.

Note that although the shift amount dx is calculated from the real zero-parallax distance F in the present embodiment, the shift amount dx can be calculated from the virtual zero-parallax distance f. Specifically, in Expression (3) above, the shift amount dx can be calculated by using the virtual camera interval e in place of the real camera interval E and the virtual zero-parallax distance f in place of the real zero-parallax distance F. Therefore, in other embodiments, the CPU 311 may calculate the shift amount dx by calculating only the virtual zero-parallax distance f without calculating the real parallax distance F.

In step S22, the CPU 311 reads out the shift amount data 83 from the main memory 32, and determines whether the shift amount dx is greater than a predetermined value A. Here, the determination process of step S22 is a process of determining whether the frame 62 is protruding out of the left captured image 55. Thus, the predetermined value A is a value (=56) obtained by subtracting ½ the horizontal length of the reference frame 61 (=200) from ½ the horizontal length of the left captured image 55 (=256). If the determination result of step S22 is affirmative, the process of step S23 is performed. On the other hand, if the determination result of step S22 is negative, the process of step S24 is performed.

In step S23, the CPU 311 shrinks the size of the frame for each of the left and right captured images. In this process, the size of the frame is shrunk so that it does not protrude out of the captured image. Moreover, in the present embodiment, the CPU 311 shrinks the frame so that the frame is as large as possible without protruding out of the captured image. That is, the CPU 311 shrinks the frame so that the protruding apices of the frame are located on the circumference of the captured image and without changing the center position. More specifically, the size of the frame in the left-right direction is reduced by twice the value obtained by subtracting the predetermined value A from the shift amount dx "2×(dx−A)". The size of the frame in the up-down direction is reduced so as to maintain the aspect ratio of the frame. The CPU 311 stores the data representing the size of the shrunk frame in the main memory 32 as the display size data 84. The process of step S25 is performed, following step S23.

On the other hand, in step S24, the CPU 311 sets the size of the frame to a predetermined reference value. The reference value is the size of the reference frame 61 described above (see FIG. 12), and is the size of 240×400 dots (vertical× horizontal) in the present embodiment. That is, the size of the frame does not change in step S24. The CPU 311 stores the data representing the size of the reference value in the main memory 32 as the display size data 84. The process of step S25 is performed, following step S24.

The display area of the captured image is determined by the series of processes of steps S21 to S24. That is, the position of the frame (the shift amount dx) is determined so that the position of the zero-parallax point in stereoscopic display is the real zero-parallax distance F (step S21), and if the frame is protruding out of the captured image (Yes in step S22), the frame is shrunk (step S23). If the frame is not protruding out of the captured image, the size of the frame is maintained to the size of the reference value (step S24). By the series of processes described above, the position and the size of the frame are determined, thus determining the display area.

In step S25, the CPU 311 renders the captured image in the display area determined by the processes of steps S21 to S24 in the left frame buffer, which is a predetermined storage area in the VRAM 313. The process of step S26 is performed, following step S25.

In step S26, the CPU 311 determines whether the recognition process of step S2 has succeeded. The process of step S26 is the same as the process of step S11. If the determination result of step S26 is affirmative, the processes of steps S27 and S28 are performed. On the other hand, if the determination result of step S26 is negative, the CPU 311 ends the left image production process, skipping the processes of steps S27 and S28. Note that where the recognition process is not performed with a cycle of one frame period in other embodiments, the CPU 311 may determine whether the recognition process has been completed in step S26, and the processes of steps S27 and S28 may be performed only if the recognition process has been completed. Or, if the recognition process has been completed, the processes of steps S27 and S28 may be performed using the settings (the position, the orientation, the viewing field range) of the virtual camera which have been used in the preceding process loop.

In step S27, the CPU 311 calculates the viewing field range (projection matrix) of the left virtual camera in accordance with the display area of the captured image. The viewing field range is calculated so that the virtual space corresponding to the real space represented by the captured image in the display area is the range. Therefore, it is possible to produce a virtual image corresponding to the display range of the captured image, and it is possible to obtain a synthesized image where the virtual object is displayed at an appropriate position on the captured image. The method for calculating the viewing field range of the virtual camera will now be described with reference to FIG. 22.

Figure 22:
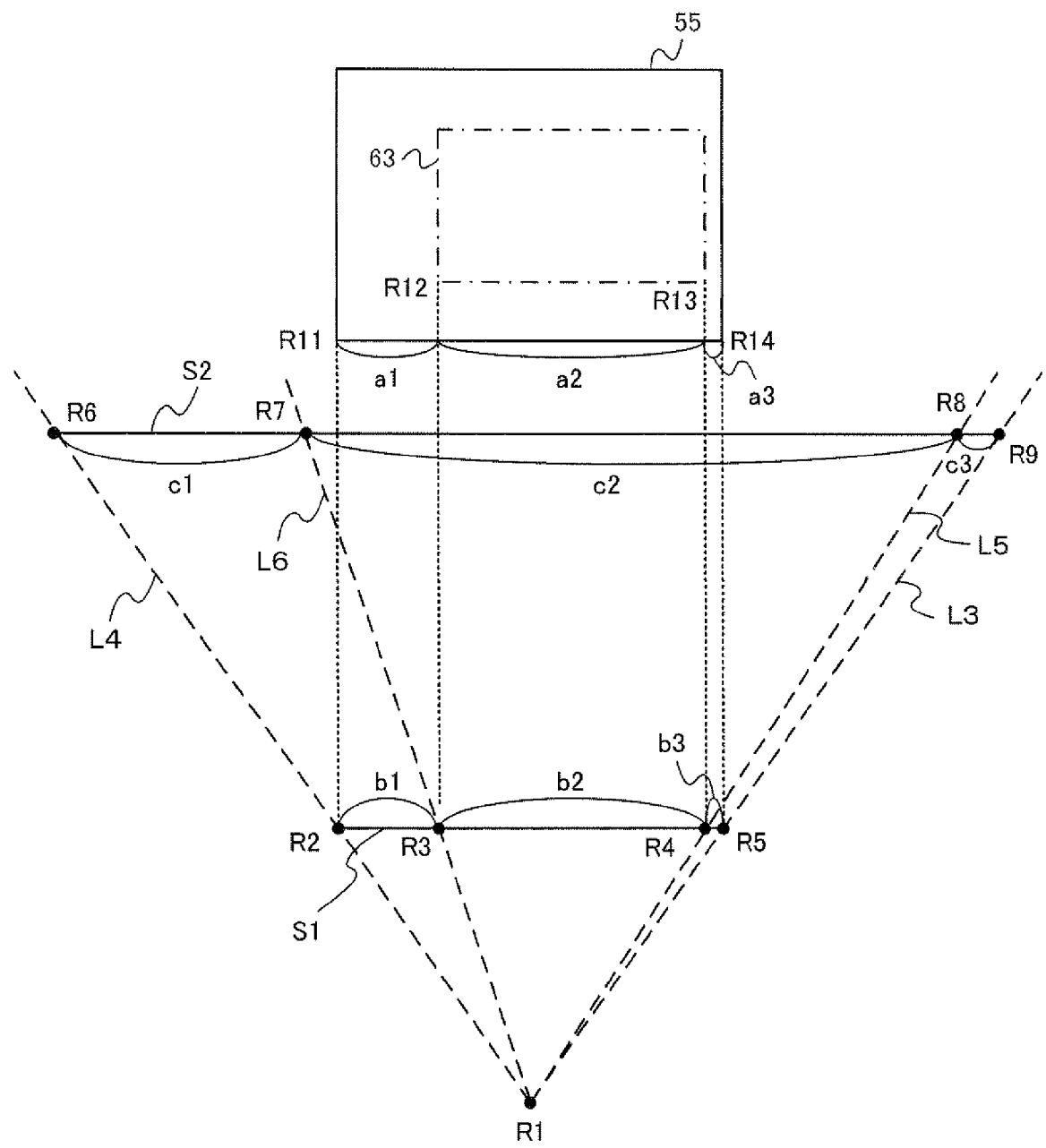
FIG. 22 is a diagram showing the correspondence between the plane of a captured image and a virtual space.

FIG. 22 is a diagram showing the correspondence between the plane of the captured image and the virtual space. In FIG. 22, the points R1-R9 represent position in the virtual space, and the points R11-R14 represent positions in the plane of the captured image. The point R1 represents the position of the left virtual camera in the virtual space, and the straight lines L3 and L4 represent the image-capturing range (viewing field range) of the left-eye camera 23a corresponding to the left virtual camera. Here, the viewing field range of the left virtual camera represented by the straight lines L3 and LA is referred to as the "total viewing field range". The plane S1 is the near clip plane of the left virtual camera, and the plane S2 is the far clip plane of the left virtual camera. The distance from the position of the left virtual camera (the point R1) to the near clip plane and the distance from the position of the left virtual camera to the far clip plane are predetermined.

As to the correspondence between the plane of the captured image and the near clip plane, the point R11 at the left edge of the left captured image 55 corresponds to the intersection R2 between the near clip plane S1 and the straight line 14 as shown in FIG. 22. The point R14 at the right edge of the left captured image 55 corresponds to the intersection R5 between the near clip plane S1 and the straight line L3.

Here, in order to set the viewing field range so that the virtual space corresponding to the display area is the range, the positional relationship of a display area 63 (with respect to the left-right direction) with respect to the whole area of the left captured image 55 is made to correspond to the positional relationship of the viewing field range of the left virtual camera with respect to the entire range. That is, at the near clip plane, the positional relationship between the points R2-R5 can be made to correspond to the positional relationship between the points R11-R14 in the captured image as shown in FIG. 22. More specifically, the point R3 and the point R4 can be set so that the ratio (b1:b2:b3) between the length b1 of the line segment R2-R3, the length b2 of the line segment R3-R4 and the length b3 of the line segment R4-R5 is equal to the ratio (a1:a2:a3) between the length a1 of the line segment R11-R12, the length a2 of the line segment R12-R13 and the length a3 of the line segment R13-R14. Here, "a1:a2:a3" is known because the display area 63 has been determined in steps S21 to S24. The positions of the point R2 and the point R5 can be calculated from the position and the orientation of the left virtual camera (view matrix) and the angle of view of the left-eye camera 23a (known). Therefore, the CPU 311 can calculate the point R3 and the point R4 such that a1:a2:a3=b1:b2:b3.

Also with the far clip plane, as with the near clip plane, the positions of the point R7 and the point R8 can be calculated. That is, the CPU 311 can calculate the point R7 and the point R8 such that the ratio (c1:c2:c3) between the length c1 of the line segment R6-R7, the length c2 of the line segment R7-R8 and the length c3 of the line segment R8-R9 is equal to "a1:a2:a3".

The viewing field range with respect to the left-right direction of the virtual camera can be determined by the point R3, the point R4, the point R7 and the point R8, which are determined as described above. That is, the CPU 311 calculates the projection matrix of the left virtual camera so that the range from the point R3 to the point R4 in the near clip plane and the range from the point R7 to the point R8 in the far clip plane are the viewing field range with respect to the left-right direction. In other words, the viewing field range with respect to the left-right direction of the virtual camera is the range represented by the straight line L5 passing through the point R1, the point R4 and the point R8 and the straight line L6 passing through the point R1, the point R3 and the point R7. Note that the viewing field range with respect to the up-down direction is determined so that the aspect ratio of the viewing field range of the left virtual camera coincides with the aspect ratio of the display area 63. As a specific process in step S27, the CPU 311 first reads out the shift amount data 83 and the display size data 84 from the main memory 32, and calculates the positions of the right edge and the left edge of the display area in the left captured image by using the shift amount dx of the display area and the size of the frame. Then, the lengths a1, a2 and a3 are calculated from the positions of the right edge and the left edge. Then, the CPU 311 reads out the virtual camera data 79 from the main memory 32, and calculates the positions of the point R2 and the point R5 on the near clip plane by using the position and the orientation of the left virtual camera and the angle of view of the left-eye camera 23a which is known. Moreover, the point R3 and the point R4 that divides the line segment R2-R5 at "a1:a2:a3" are calculated, and a projection matrix in which the point R3 and the point R4 are used as the viewing field range of the left-right direction is calculated. Thus, it is possible to calculate the projection matrix of the left virtual camera corresponding to the display area 63. Finally, the CPU 311 stores the data representing the calculated projection matrix in the main memory 32 as the viewing field range data 85. The process of step S28 is performed is performed, following step S27 described above.

Note that in the process of step S27, in order to calculate the viewing field range of the virtual camera, the CPU 311 calculates the positions (the point R3 and the point R4) of the left and right edges of the viewing field range based on the positional relationship (ratio) between the points R2-R5. Here, the specific method for calculating the viewing field range of the virtual camera is not limited to the above, and may be any method as long as it is possible to calculate the positions of the point R3 and the point R4. For example, the CPU 311 may calculate the shift amount from the reference position of the viewing field range in other embodiments. Specifically, first, the CPU 311 sets a reference viewing field range in the near clip plane. The reference viewing field range is a viewing field range that is facing in the front direction (so that the angle of view is equally set with respect to the image-capturing direction) from the position of the left virtual camera toward the image-capturing direction thereof, and is a viewing field range of the virtual camera corresponding to the reference frame 61 described above. Since the ratio of the size of the reference viewing field range with respect to the entire range viewing field in the near clip plane described above is equal to the ratio of the display area 63 with respect to the whole area of the captured image 55, it is possible to calculate the size of the reference viewing field range from this relationship.

Here, where Δx denotes the shift amount from the reference viewing field range to the viewing field range to be calculated, the shift amount Δx is in proportion to the shift amount dx of the display area. The ratio of the shift amount Δx of the viewing field range with respect to the width of the entire range viewing field (the length of the points R2-R5) in the near clip plane is equal to the ratio of the shift amount dx of the display area with respect to the width of the captured image 55 (the length of the points R11-R14). Therefore, the CPU 311 calculates the shift amount Δx of the viewing field range based on the ratio relationship described above. Then, the viewing field range to be calculated is obtained by moving the left side and the right side of the reference viewing field range by the calculated shift amount Δx. Note that the positions of the upper side and the lower side of the reference viewing field range remain unchanged. Thus, the four sides in the near clip plane of the view volume are obtained, and it is possible with a well-known method to obtain the four sides of the far clip plane of the view volume. Thus, the CPU 311 may identify the viewing field range (the point R3 and the point P4) by calculating the shift amount Δx of the viewing field range.

In step S28, the CPU 311 produces an image of the virtual object as seen from the left virtual camera based on the position, the orientation and the viewing field range of the left virtual camera which have been set in steps S14 and S27. That is, the CPU 311 reads out the virtual camera data 79 and the viewing field range data 85 from the main memory 32, and produces image data of the virtual object using the view matrix of the left virtual camera and the projection matrix. Note that no object to be the background is placed in the virtual space, and the background of the virtual image is transparent. Moreover, the CPU 311 renders the produced virtual object image in the left frame buffer in the VRAM 313. Thus, the left virtual image is synthesized with the left captured image which has been rendered in the left frame buffer in step S25. Note that since the background of the virtual image is transparent, the synthesized image is an image obtained by overlaying the virtual object image on the left captured image. Since the virtual object is placed using the virtual marker position as a reference as described above in step S3, the virtual object is displayed at or around the position of the marker 53 in the synthesized image. After step S28, the CPU 311 ends the left image production process.

Referring back to FIG. 16, the process of step S6 is performed is performed, following the left image production process of step S5. In step S6, the CPU 311 performs the right image production process. The right image production process is a process of producing a right-eye image (right synthesized image) used in stereoscopic display.

Also in the right image production process, a synthesized image is produced basically in a similar manner to the left image production process. Note however that in the present embodiment, the frame shift amount is the same and the size of the frame is also set to be the same between the left captured image and the right captured image. Therefore, the series of steps S21 to S24 do not have to be performed in the right image production process. That is, in the right image production process, the shift amount may be set to "−dx" (the direction of the shift is opposite to dx) in place of the calculated shift amount dx in step S21, and the size of the frame which is set in step S23 or S24 may be used to determine the display area. Then, the display area of the right captured image is located to the left of the center of the right captured image by the shift amount dx and has the same size as the display area of the left captured image. Note that also with the right captured image, as with the left captured image, the point located at the real zero-parallax distance F is located at the center of the display area.

In the right image production process, as in the left image production process, once the display area is determined, the CPU 311 renders the right captured image in the display area in the right frame buffer which is a predetermined storage area in the VRAM 313.

Moreover, also in the right image production process, processes similar to steps S26 to S28 of the left image production process are performed. That is, the CPU 311 performs the process of calculating the viewing field range of the right virtual camera corresponding to the display area. Note that also with the right captured image, the viewing field range of the right virtual camera can be calculated by a method similar to the method shown in FIG. 22. Moreover, the CPU 311 produces an image of the virtual object as seen from the right virtual camera based on the position, the orientation and the viewing field range of the right virtual camera which have been set, and renders the image of the virtual object in the right frame buffer in the VRAM 313. Thus, the left virtual image is synthesized with the left captured image which is rendered in the right frame buffer. The process of step S7 is performed, following step S6 as described above.

In step S7, the CPU 311 displays the left and right synthesized images on the upper LCD 22. That is, the left synthesized image rendered in the left frame buffer in the VRAM 313 and the right synthesized image rendered in the right frame buffer are alternately arranged by vertical lines of the upper LCD 22, thereby producing display. Thus, a stereoscopic display is produced by using the left and right synthesized images. The process of step S8 is performed is performed, following step S7.

In step S8, the CPU 311 waits for an interrupt signal (vertical interrupt) from the upper LCD 22, and the process of step S1 is performed again when the interrupt signal is generated. Thus, the processes of steps S1 to S8 are repeated with a certain cycle (a cycle of one frame period (1/60)). Note that the series of game processes of steps S1 to S8 is ended when, for example, the game is cleared, the game is over, the player gives an instruction to quite the game, etc.

As described above, with the game process, the virtual marker distance d corresponding to the distance D from the outer camera 23 to the marker 53 is calculated (step S13), and the zero-parallax distance F is determined in accordance with the virtual marker distance d (step S16, S17). Then, the parallax is adjusted so that the position of the zero-parallax point in stereoscopic display is the zero-parallax distance F (step S21). Therefore, with the game process, the parallax is automatically adjusted so as to achieve a zero-parallax distance in accordance with the distance D to the marker 53. With this, the game device 10 can, for example, automatically set the zero-parallax point to the position of the marker 53, or automatically set the zero-parallax point to the position of the virtual object 54 displayed around the marker 53. Therefore, according to the present embodiment, when producing stereoscopic display of a synthesized image which is produced by using an augmented reality technique, it is possible to display an image of a virtual object in a manner easy to view.

[Variations]

(Variation where Zero-Parallax Distance is not Calculated)

In the embodiment above, the game device 10 actually calculates the zero-parallax distance F in accordance with the distance D from the outer camera 23 to the marker 53 (step S17), and adjusts the parallax (determines the display area) so that the position of the zero-parallax point in stereoscopic display is the zero-parallax distance F. Here, in other embodiments, the parallax may be automatically adjusted so as to achieve a zero-parallax distance in accordance with the distance D by a method in which the zero-parallax distance F is not calculated. Specifically, where the marker 53 included in each captured image is recognized, the game device 10 may perform matching between the images of the marker 53 included in the left and right captured images and determine the display area so that the positions of the marker 53 coincide with each other between the left and right captured images. Alternatively, the zero-parallax distance may be shifted from the distance to the marker 53 by shifting the display area by a predetermined amount from a position where the positions of the marker 53 coincide with each other between the left and right captured images. Since an adjustment can be made so that the parallax of the marker 53 is zero by the method described above, the zero-parallax distance in stereoscopic display can be a distance in accordance with the distance D as in the embodiment above. Note however that since the distance D and the zero-parallax distance F are not actually calculated by the method above, it is difficult to set the zero-parallax distance with a high precision, e.g., "set the zero-parallax point to a position that is nearer by a predetermined distance with respect to the distance D to the marker 53". For example, it is difficult by the method above to adjust the parallax so that the zero-parallax point is set at a virtual object displayed at a position that is away from the marker 53 by a predetermined distance. In contrast, in the embodiment above, the zero-parallax distance F is actually calculated by actually calculating the distance corresponding to the distance D (the virtual marker distance d), and it is therefore possible to adjust the zero-parallax distance with a high precision. Therefore, where the zero-parallax point is set at the position of the virtual object, for example, the method in which the zero-parallax distance is calculated as in the embodiment above is effective.

(Variation Regarding Order of Display Area Determination Process and Synthesized Image Production Process)

In the embodiment above, the game device 10 determines the display area of the captured image (steps S21 to S24), and then produces a virtual image corresponding to the captured image in the display area to synthesize the captured image and the virtual image with each other (step S28). Here, in other embodiments, an image to be displayed on the upper LCD 22 may be produced by a procedure in which the order of the display area determination process and the synthesized image production process is reversed from that of the embodiment above. Specifically, the game device 10 first produces, for each captured image, a virtual image corresponding to the entire area of the captured image, and synthesizes the produced virtual image and the entire area of the captured image with each other, thereby producing a synthesized image corresponding to the entire area of the captured image. Then, the game device 10 determines the display area for the synthesized image by a method similar to steps S21 to S24 described above. Also by this, as in the embodiment above, the zero-parallax distance in stereoscopic display can be a distance in accordance with the distance D from the outer camera 23 to the marker 53. Note that with the procedure above, the viewing field range of the virtual camera for producing the virtual image can be set to a range corresponding to the viewing field range of the outer camera 23, and it is therefore possible to easily calculate the viewing field range of the virtual camera. Note however that the area over which the virtual image and the synthesized image are produced is increased, and it is necessary to produce the synthesized image even in areas where it is not actually displayed.

Note that even where the procedure above is employed, the game device 10 may use a method in which the zero-parallax distance is not calculated. That is, the game device 10 may produce a synthesized image corresponding to the entire area of the captured image, and then perform matching between the left and right synthesized images to determine the display area so that the position of the virtual object included in the synthesized image is the same between the left and right synthesized images.

(Variation Regarding Display Area)

In the embodiment above, the game device 10 sets the display area for each captured image in order to determine the display positions of the left and right captured images so as to adjust the zero-parallax distance in stereoscopic display. Here, in other embodiments, the game device 10 may display the entire captured images on the upper LCD 22. For example, referring to FIG. 10, in other embodiments, the game device 10 may display the entire left captured image 55 and the entire right captured image 56 while shifting them in accordance with the zero-parallax distance on the upper LCD 22. Then, the screen area of the upper LCD 22 includes an area where only the left captured image 55 is displayed and an area where only the right captured image 56 is displayed, resulting in an image that is slightly less easy to view, as compared with the embodiment above, with portions that are not stereoscopically viewable. Note however that even in such a case, the parallax is automatically adjusted so as to achieve a zero-parallax distance in accordance with the distance D from the outer camera 23 to the marker 53, and it is therefore possible to obtain similar effects to those of the embodiment above.

In the embodiment above, the game device 10 performs a process of shrinking the display area (step S23) so as to produce stereoscopic display that is easier to view when the zero-parallax distance is short. Here, in other embodiments, the process of shrinking the display area does not always have to be performed.

(Variation Regarding Zooming Process)

Note that in other embodiments, the game device 10 may perform a correction process by calibration on the captured image captured by the outer camera 23. Here, there may be attachment errors in the cameras 23a and 23b of the outer camera 23, and in such a case, the captured images shift from ideal images (images captured by the cameras 23a and 23b which are attached with an ideal position and orientation) due to the attachment errors. Therefore, who makes the game device 10 (or the game program) can measure the shift of captured images from ideal images in advance so that the game device 10 can perform a correction that cancels out the shift of the captured images.

Figure 23:
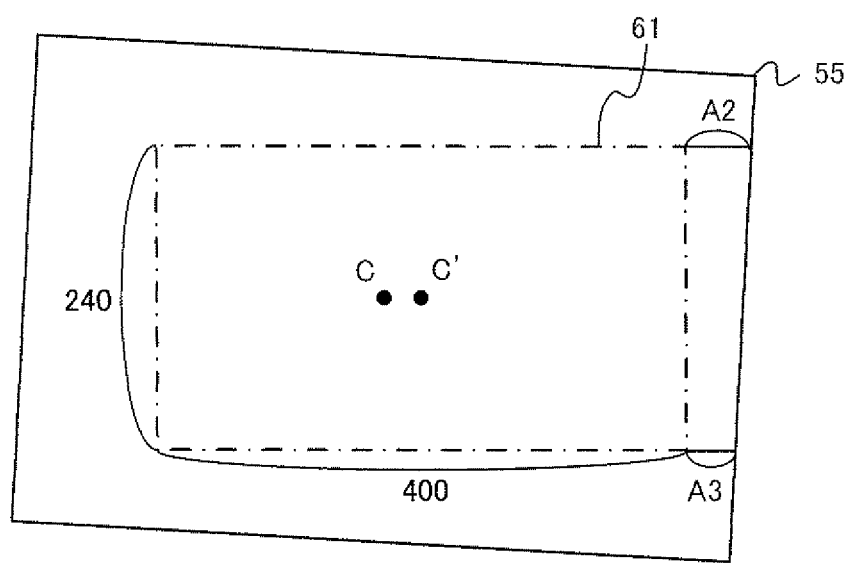
FIG. 23 is a diagram showing the relationship between a captured image having undergone a correction process and a display area.

Here, where the correction process is performed, the process of determining whether or not to perform the process of shrinking the display area (step S23) is preferably performed as follows. FIG. 23 is a diagram showing the relationship between the corrected captured image and the display area. In FIG. 23, it is assumed that the left captured image 55 is rotated by a predetermined angle and translated by a predetermined length (the length from the center point C of the captured image to the center point C' of the display area) by the correction process. A2 and A3 denote the distances from the two apices on the right side of the reference frame 61 to the right side of the left captured image 55. Where the correction process is performed, if the shift amount dx is larger than the shortest one (A3 in FIG. 23) of the predetermined value A, the distance A2 and the distance A3, the frame (display area) protrudes out of the left captured image 55. Therefore, in such a case, in the determination process of step S22, the CPU 311 preferably makes the determination using the shortest value of the predetermined value A, the distance A2 and the distance A3. Then, the game device 10 can more accurately determine whether the frame is protruding out of the captured image.

(Other Variations)

In the embodiment above, the game device 10 displays a stereoscopic image on the upper LCD 22 by using captured images that are obtained in real time by the outer camera 23. Here, in other embodiments, the game device 10 may display a stereoscopic image on the upper LCD 22 by using image data which have been captured in the past by the outer camera 23, an external stereo camera, etc. Although the outer camera 23 is installed in advance on the game device 10 in the embodiment above, an external-type camera that can be attached to the game device 10 may be used in place of the outer camera 23 in other embodiments.

Although the upper LCD 22 is installed in advance on the game device 10 in the embodiment above, an external-type stereoscopic display that can be attached to the game device 10 may be used in place of the upper LCD 22 in other embodiments.

While the upper LCD 22 is a stereoscopic display device of a parallax barrier type in the embodiment above, the upper LCD 22 may be a stereoscopic display device of any other type such as a lenticular type in other embodiments. For example, where a stereoscopic display device of a lenticular type is used, the left-eye image and the right-eye image may be synthesized together by the CPU 311 or another processor, and then the synthesized image may be supplied to the stereoscopic display device of a lenticular type.

Although the stereoscopic image display process is performed during the game process using the game device 10 in the embodiment above, the stereoscopic image display process may be performed by any information processing devices or information processing systems (e.g., PDAs (Personal Digital Assistants), mobile telephones, personal computers, cameras, etc.) in other embodiments.

Although the game process (stereoscopic image display process) is performed by only a single information processing device (the game device 10) in the embodiment above, the stereoscopic image display process may be performed by a stereoscopic image display system including a plurality of information processing devices that can communicate with one another so that the stereoscopic image display process is allotted among the plurality of information processing devices in other embodiments.

There may be provided a storage medium having stored therein an image display program to be executed by a computer of a portable electronic device including, provided on a front surface thereof, a stereoscopic display member for displaying, in substantially a same display area, a right-eye image and a left-eye image, thereby allowing for stereoscopic viewing, and including, provided on a back surface thereof, a right-eye real camera and a left-eye real camera, for stereoscopically displaying a captured image on the stereoscopic display member by using a right captured image outputted from the right-eye real camera and a left captured image outputted from the left-eye real camera.

The image display program instructs the computer to function as:

a reference distance setting section for setting a reference distance for a distance from the real camera in an image-capturing direction; and a stereoscopic display control section for displaying the right captured image in the display area so that a reference point in the right captured image is displayed at a center of the display area and displaying the left captured image in the display area so that a reference point in the left captured image is displayed at the center of the display area, wherein the reference point is a point that is away from the real cameras by the reference distance in the image-capturing direction of the two real cameras on a straight line passing through a median point between the two real cameras and extending in the image-capturing direction.

A portable electronic device including, provided on a front surface thereof, a stereoscopic display member for displaying, in substantially a same display area, a right-eye image and a left-eye image, thereby allowing for stereoscopic viewing, and including, provided on a back surface thereof, a right-eye real camera and a left-eye real camera, for stereoscopically displaying a captured image on the stereoscopic display member by using a right captured image outputted from the right-eye real camera and a left captured image outputted from the left-eye real camera, wherein the portable electronic device may include:

a reference distance setting section for setting a reference distance for a distance from the real camera in an image-capturing direction; and a stereoscopic display control section for displaying the right captured image in the display area so that a reference point in the right captured image is displayed at a center of the display area and displaying the left captured image in the display area so that a reference point in the left captured image is displayed at the center of the display area, wherein the reference point is a point that is away from the real cameras by the reference distance in the image-capturing direction of the two real cameras on a straight line passing through a median point between the two real cameras and extending in the image-capturing direction.

An image display method to be carried out by a computer of a portable electronic device including, provided on a front surface thereof, a stereoscopic display member for displaying, in substantially a same display area, a right-eye image and a left-eye image, thereby allowing for stereoscopic viewing, and including, provided on a back surface thereof, a right-eye real camera and a left-eye real camera, for stereoscopically displaying a captured image on the stereoscopic display member by using a right captured image outputted from the right-eye real camera and a left captured image outputted from the left-eye real camera, wherein the image display method may include:

a reference distance setting step of setting a reference distance for a distance from the real camera in an image-capturing direction; and a stereoscopic display control step of displaying the right captured image in the display area so that a reference point in the right captured image is displayed at a center of the display area and displaying the left captured image in the display area so that a reference point in the left captured image is displayed at the center of the display area, wherein the reference point is a point that is away from the real cameras by the reference distance in the image-capturing direction of the two real cameras on a straight line passing through a median point between the two real cameras and extending in the image-capturing direction.

As described above, the present invention can be used as a game program or a game device, for example, for the purpose of displaying virtual images in a manner easy to view in cases where images produced by using augmented reality techniques are stereoscopically displayed.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an image display program for stereoscopically displaying a captured image on a stereoscopically-viewable stereoscopic display by displaying, in substantially a same display area, a right-eye image and a left-eye image by using a right captured image outputted from a right-eye real camera and a left captured image outputted from a left-eye real camera, wherein the image display program, when executed, causes a computer to at least:

set a reference distance for a distance from the real cameras in an image-capturing direction, the setting of the reference distance comprising calculating a distance to a predetermined image-capture object, and setting the reference distance based on the calculated distance;

display the right and left captured images in the display area so that a reference point common to the right and left captured images is displayed at a center of the display area, wherein the reference point is a point that is away from the real cameras by the reference distance in the image-capturing direction of the two real cameras on a straight line passing through a median point between the two real cameras and extending in the real camera image-capturing direction;

set a right-eye virtual camera and a left-eye virtual camera in a virtual space; and stereoscopically display a virtual image by displaying in the display area a right virtual image obtained by capturing an image of the virtual space with the right-eye virtual camera and a left virtual image obtained by capturing an image of the virtual space with the left-eye virtual camera, wherein the left and right virtual images have a common virtual reference point and a projection matrix of the right virtual camera is set so that the virtual reference point in the right virtual image is displayed at the center of the display area and a projection matrix of the left virtual camera is set so that the virtual reference point in the left virtual image is displayed at the center of the display area, wherein the virtual reference point is a point that is away from the virtual cameras by a distance corresponding to the reference distance in an image-capturing direction of the two virtual cameras on a straight line passing through a median point between the two virtual cameras and extending in the virtual camera image-capturing direction, and wherein the image display program further causes the computer to recognize, using at least one of the right captured image and the left captured image, a position and an orientation of the predetermined image-capture object in the captured image so as to calculate position/orientation information representing a relative position and orientation relationship between the predetermined image-capture object and the real cameras, and to calculate a distance between the predetermined image-capture object and the real cameras based on the position/orientation information.

2. The storage medium according to claim 1, wherein the image display program further causes the computer to at least:

determine a right display area which is an area of the right captured image to be displayed in the display area and which is centered about a point corresponding to the reference point in the right captured image, and determine a left display area which is an area of the left captured image to be displayed in the display area and which is centered about a point corresponding to the reference point in the left captured image; and display the right display area of the right captured image and the left display area of the left captured image in the display area based on the determined areas.

3. The storage medium according to claim 1, wherein the reference distance is fixedly set.

4. The storage medium according to claim 1,
wherein the image display program further causes the computer to set the reference distance using the calculated distance as a reference.

5. The storage medium according to claim 4, wherein the image display program further causes the computer to set, as the reference distance, a value obtained by adding or subtracting a value to/from the calculated distance.

6. The storage medium according to claim 1,
wherein the image display program further causes the computer to recognize, using both of the right captured image and the left captured image, the position and the orientation of the predetermined image-capture object in the captured image so as to calculate the position/orientation information representing the relative position and orientation relationship between the predetermined image-capture object and the real cameras, thereby calculating a distance between the predetermined image-capture object and the real cameras based on the position/orientation information.

7. The storage medium according to claim 1, wherein the image display program further causes the computer to display the right captured image and the left captured image in the display area so that the reference point is displayed at the center of the display area by using an angle of view of the real cameras and a distance between the real cameras.

8. An image display device for stereoscopically displaying a captured image on a stereoscopically-viewable stereoscopic display by displaying, in substantially a same display area, a right-eye image and a left-eye image by using a right captured image outputted from a right-eye real camera and a left captured image outputted from a left-eye real camera, the image display device comprising:

processing circuitry including a processor, the processing circuitry being configured to control the image display device to at least:

set a reference distance for a distance from the real cameras in an image-capturing direction, the setting of the reference distance comprising calculating a distance to a predetermined image-capture object, and setting the reference distance based on the calculated distance;

display the right and left captured images in the display area so that a reference point common to the right and left captured images is displayed at a center of the display area, wherein the reference point is a point that is away from the real cameras by the reference distance in the image-capturing direction of the two real cameras on a straight line passing through a median point between the two real cameras and extending in the real camera image-capturing direction;

set a right-eye virtual camera and a left-eye virtual camera in a virtual space; and stereoscopically display a virtual image by displaying in the display area a right virtual image obtained by capturing an image of the virtual space with the right-eye virtual camera and a left virtual image obtained by capturing an image of the virtual space with the left-eye virtual camera, wherein the left and right virtual images have a common virtual reference point and the virtual camera setting section sets a projection matrix of the right virtual camera so that the virtual reference point in the right virtual image is displayed at the center of the display area and sets a projection matrix of the left virtual camera so that the virtual reference point in the left virtual image is displayed at the center of the display area, wherein the virtual reference point is a point that is away from the virtual cameras by a distance corresponding to the reference distance in an image-capturing direction of the two virtual cameras on a straight line passing through a median point between the two virtual cameras and extending in the virtual camera image-capturing direction, and wherein the processing circuitry is configured to control the image display device to recognize, using at least one of the right captured image and the left captured image, a position and an orientation of the predetermined image-capture object in the captured image so as to calculate position/orientation information representing a relative position and orientation relationship between the predetermined image-capture object and the real cameras, and to calculate a distance between the predetermined image-capture object and the real cameras based on the position/orientation information.

9. An image display system for stereoscopically displaying a captured image on a stereoscopically-viewable stereoscopic display by displaying, in substantially a same display area, a right-eye image and a left-eye image by using a right captured image outputted from a right-eye real camera and a left captured image outputted from a left-eye real camera, the system comprising:
a reference distance setting section for setting a reference distance for a distance from the real cameras in an image-capturing direction, the reference distance setting section being configured to calculate a distance to a predetermined image-capture object, and to set the reference distance based on the calculated distance;
a stereoscopic display controller for displaying the right and left captured images in the display area so that a reference point common to the right and left captured images is displayed at a center of the display area, wherein the reference point is a point that is away from the real cameras by the reference distance in the image-capturing direction of the two real cameras on a straight line passing through a median point between the two real cameras and extending in the real camera image-capturing direction;
a virtual camera setting section for setting a right-eye virtual camera and a left-eye virtual camera in a virtual space; and
a virtual image stereoscopic display controller for stereoscopically displaying a virtual image by displaying in the display area a right virtual image obtained by capturing an image of the virtual space with the right-eye virtual camera and a left virtual image obtained by capturing an image of the virtual space with the left-eye virtual camera,
wherein the left and right virtual images have a common virtual reference point and a virtual camera setting section sets a projection matrix of the right virtual camera so that the virtual reference point in the right virtual image is displayed at the center of the display area and sets a projection matrix of the left virtual camera so that the virtual reference point in the left virtual image is displayed at the center of the display area,
wherein the virtual reference point is a point that is away from the virtual cameras by a distance corresponding to the reference distance in an image-capturing direction of the two virtual cameras on a straight line passing through a median point between the two virtual cameras and extending in the virtual camera image-capturing direction, and
wherein the system is configured to recognize, using at least one of the right captured image and the left captured image, a position and an orientation of the predetermined imagecapture object in the captured image so as to calculate position/orientation information representing a relative position and orientation relationship between the predetermined imagecapture object and the real cameras, and to calculate a distance between the predetermined image-capture object and the real cameras based on the position/orientation information.

10. An image display method to be executed by a computer for stereoscopically displaying a captured image on a stereoscopically-viewable stereoscopic display by displaying, in substantially a same display area, a right-eye image and a left-eye image by using a right captured image outputted from a right-eye real camera and a left captured image outputted from a left-eye real camera, the method comprising:
setting a reference distance for a distance from the real cameras in an image-capturing direction, the setting of the reference distance comprising calculating a distance to a predetermined image-capture object, and setting the reference distance based on the calculated distance;
displaying the right and left captured images in the display area so that a reference point common to the right and left captured images is displayed at a center of the display area, wherein the reference point is a point that is away from the real cameras by the reference distance in the image-capturing direction of the two real cameras on a straight line passing through a median point between the two real cameras and extending in the real camera image-capturing direction;
setting a right-eye virtual camera and a left-eye virtual camera in a virtual space; and stereoscopically displaying a virtual image by displaying in the display area a right virtual image obtained by capturing an image of the virtual space with the right-eye virtual camera and a left virtual image obtained by capturing an image of the virtual space with the left eye virtual camera,
wherein the left and right images have a common virtual reference point and a projection matrix of the right virtual camera is set so that the virtual reference point in the right virtual image is displayed at the center of the display area and a projection matrix of the left virtual camera is set so that the virtual reference point in the left virtual image is displayed at the center of the display area,
wherein the virtual reference point is a point that is away from the virtual cameras by a distance corresponding to the reference distance in an image-capturing direction of the two virtual cameras on a straight line passing through a median point between the two virtual cameras and extending in the virtual camera image-capturing direction, and
wherein the method further comprises recognizing, using at least one of the right captured image and the left captured image, a position and an orientation of the predetermined image-capture object in the captured image so as to calculate position/orientation information representing a relative position and orientation relationship between the predetermined image-capture object and the real cameras, and to calculate a distance between the predetermined image-capture object and the real cameras based on the position/orientation information.

* * * * *